United States Patent [19]

Austill

[11] Patent Number: 5,161,891
[45] Date of Patent: Nov. 10, 1992

[54] PROCESS FOR DETERMINING AND CONTROLLING RAILROAD RAIL'S NEUTRAL TEMPERATURE TO PREVENT TRACK BUCKLING AND RAIL FRACTURES

[75] Inventor: Robert J. Austill, Santa Clara, Calif.

[73] Assignee: Practical Transportation, Inc., Santa Clara, Calif.

[21] Appl. No.: 655,120

[22] Filed: Feb. 12, 1991

[51] Int. Cl.⁵ ............... G01K 13/00; G01M 5/00; G01B 5/30
[52] U.S. Cl. ............................. 374/141; 374/55; 374/142; 33/1 Q; 33/790; 73/146; 73/786
[58] Field of Search ............... 374/51, 52, 141, 142, 374/143, 16, 4, 55; 33/787, 790, 1 Q; 73/783, 790, 785, 786, 146

[56] References Cited

U.S. PATENT DOCUMENTS

| | | | |
|---|---|---|---|
| 651,135 | 6/1900 | Dudley | 73/790 X |
| 924,427 | 6/1909 | Chapman | 33/790 |
| 941,359 | 11/1909 | Cowen | 374/55 |
| 1,489,115 | 4/1924 | Chevenard | 374/55 X |
| 1,641,295 | 6/1927 | Scott | 73/198 |
| 1,708,333 | 4/1929 | Smith | 73/786 X |
| 2,099,662 | 11/1937 | Slonneger | 33/790 |
| 3,696,512 | 10/1972 | von Marinelli et al. | 33/790 |
| 4,075,889 | 2/1978 | Jones | 73/146 |
| 4,694,690 | 9/1987 | Jones et al. | 73/146 |

Primary Examiner—William A. Cuchlinski, Jr.
Assistant Examiner—G. Bradley Bennett
Attorney, Agent, or Firm—Robert R. Hubbard

[57] ABSTRACT

In order to determine a rail's neutral temperature, the length of an unconstrained piece of steel (or "gage") is compared with a similar length of railroad track rail which is constrained and thereby deflected at most temperatures because of the track structure's tie-in to the earth's surface. The gage represents the length that the counterpart piece of rail would be if it were not constrained by the track's connection to the earth's surface. The difference in length is an analog of an associated rail characteristic, such as the number of degrees that the rail's instantaneous temperature (e.g., in degrees F) is above or below the rail's neutral temperature. Length comparisons are made with precision measuring devices configured to directly read out in conventional units the rail characteristic being considered, such as pounds of force or rail neutral temperature in degrees F.

19 Claims, 11 Drawing Sheets

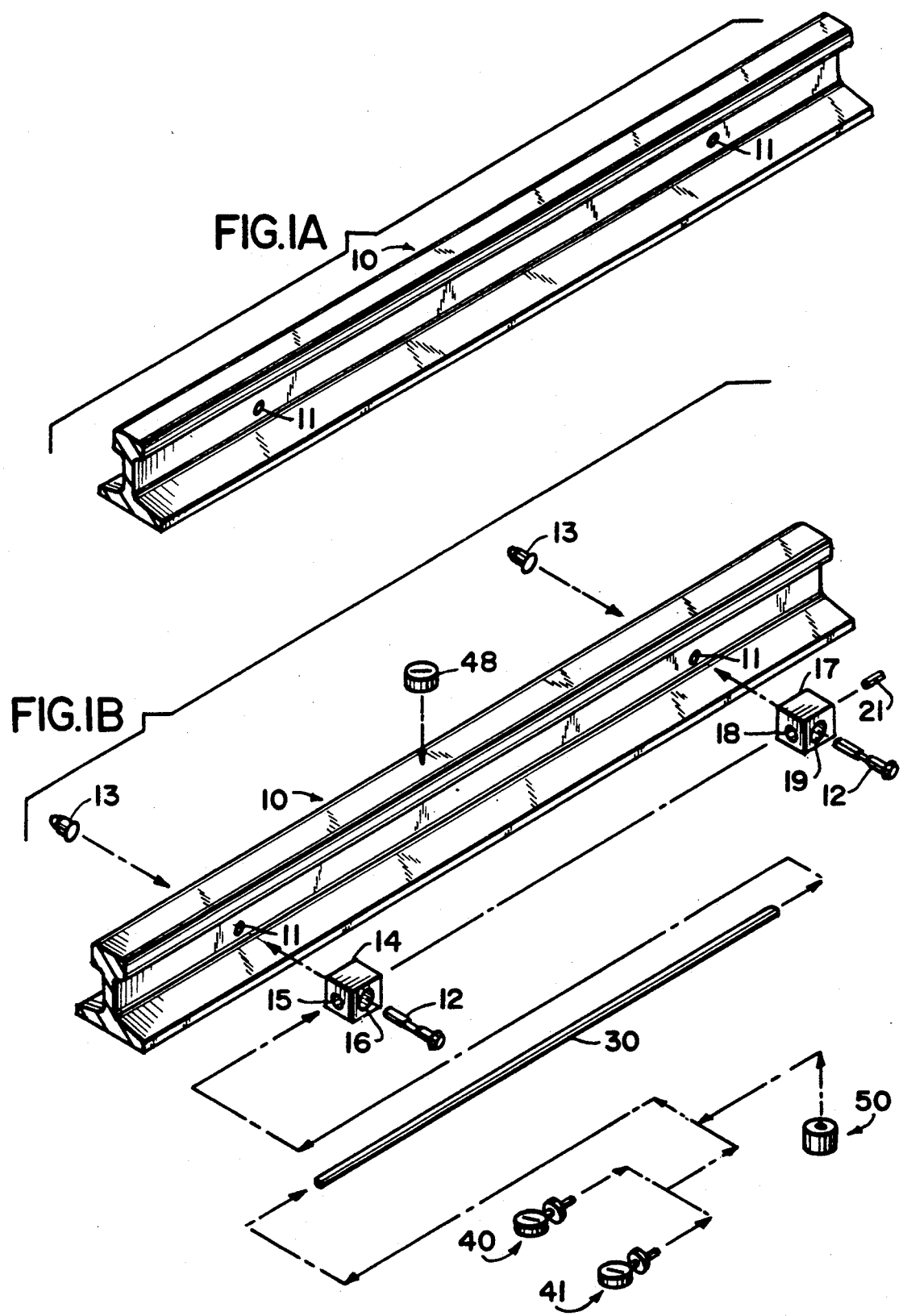

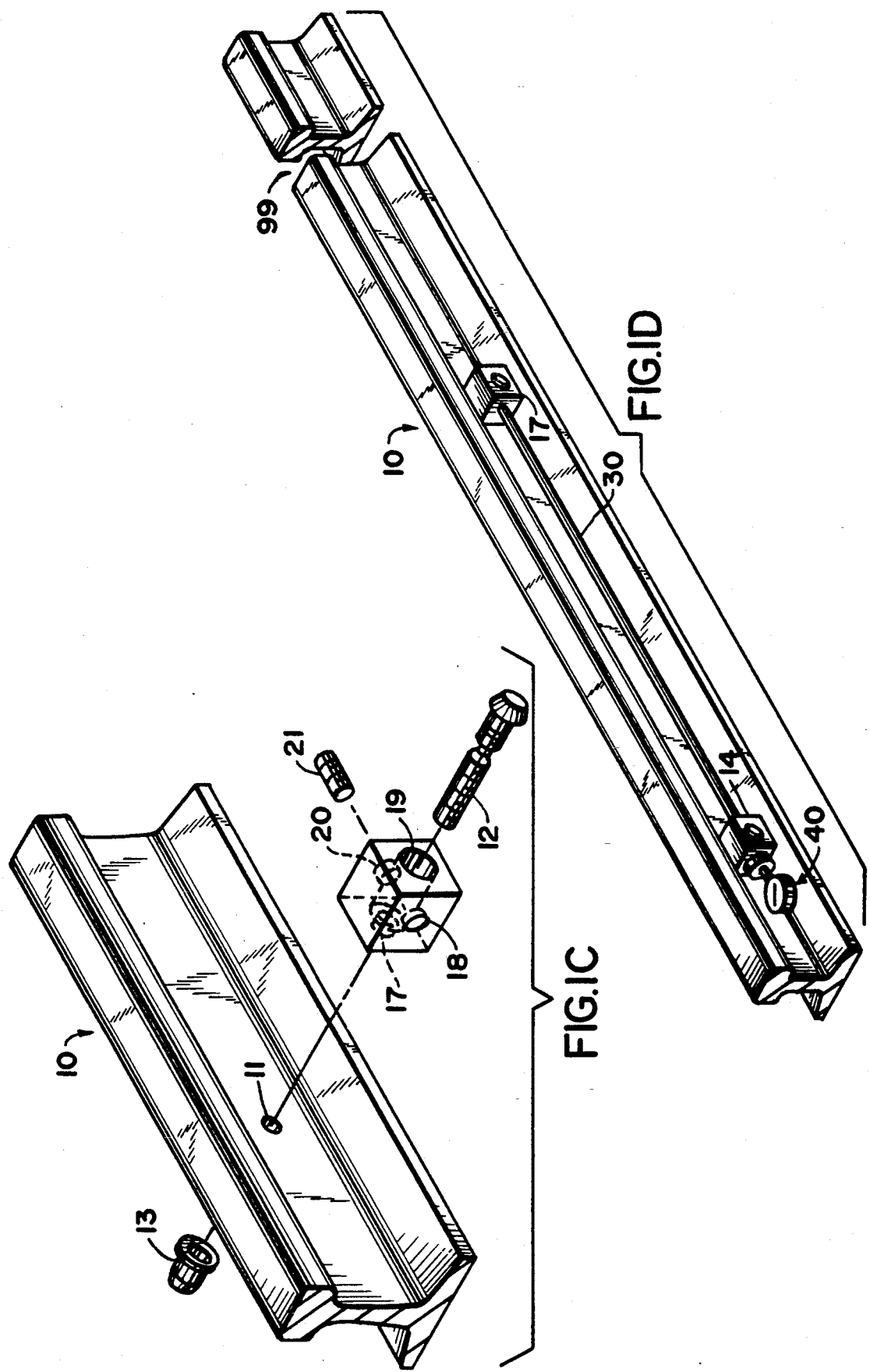

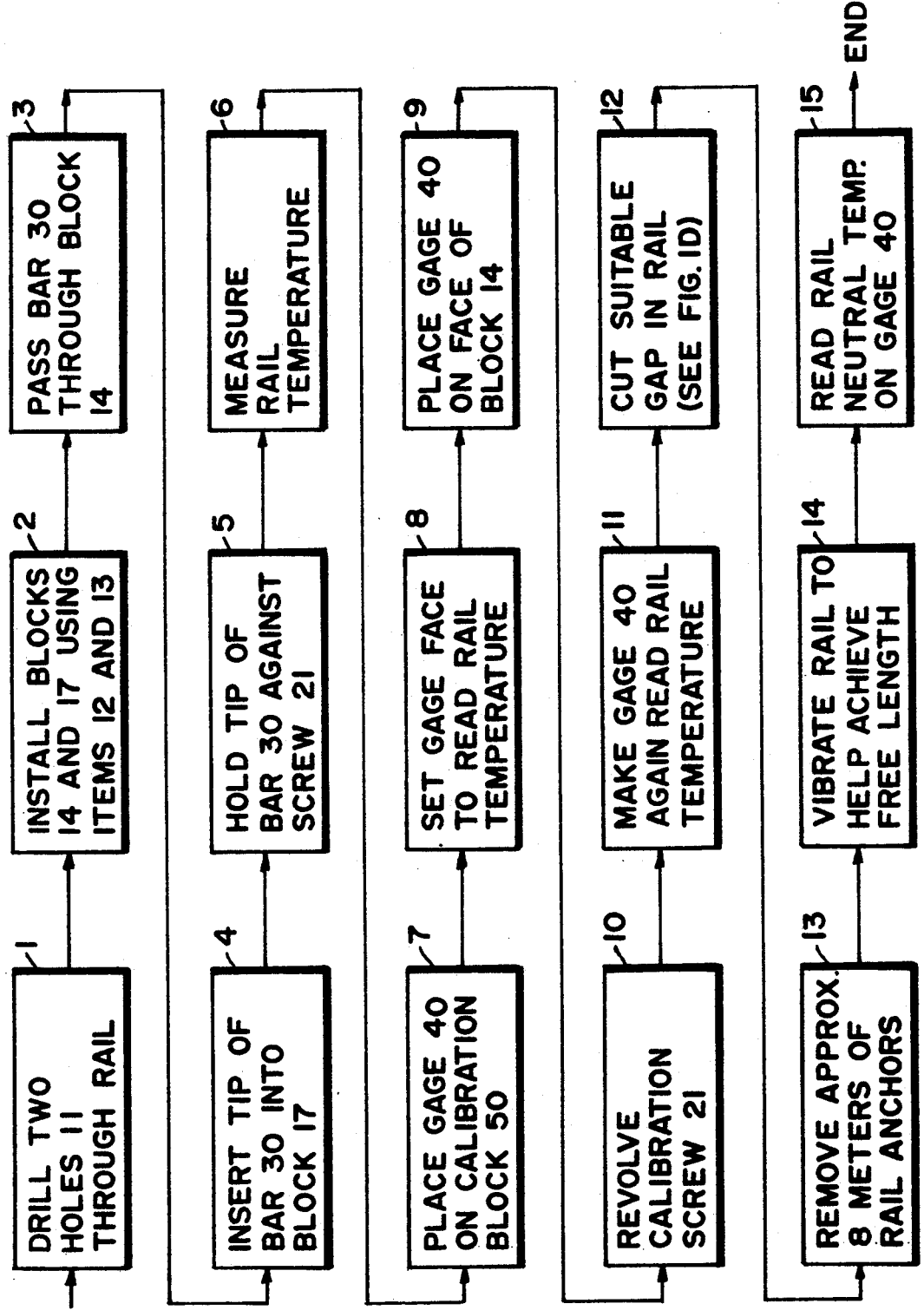

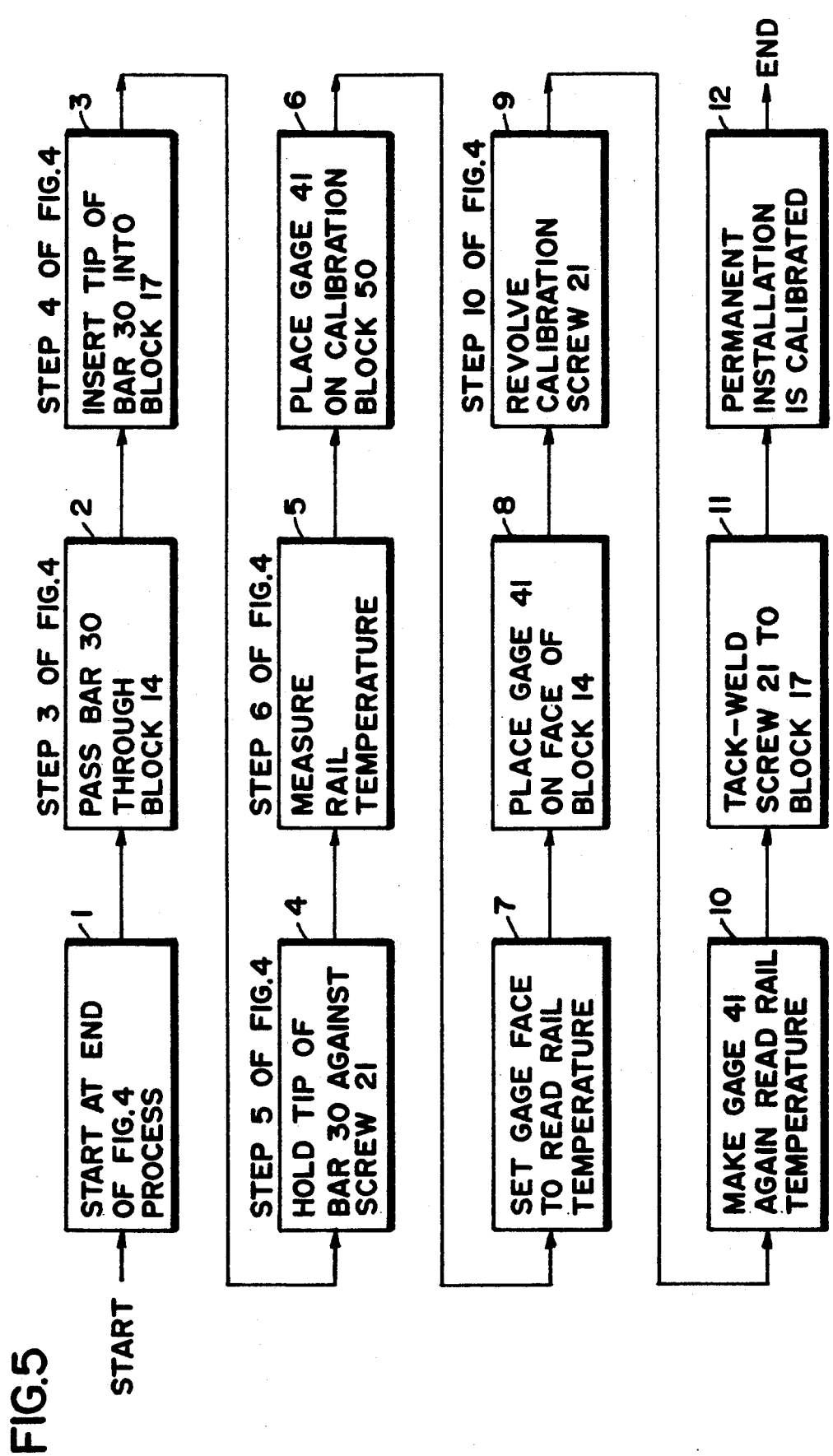

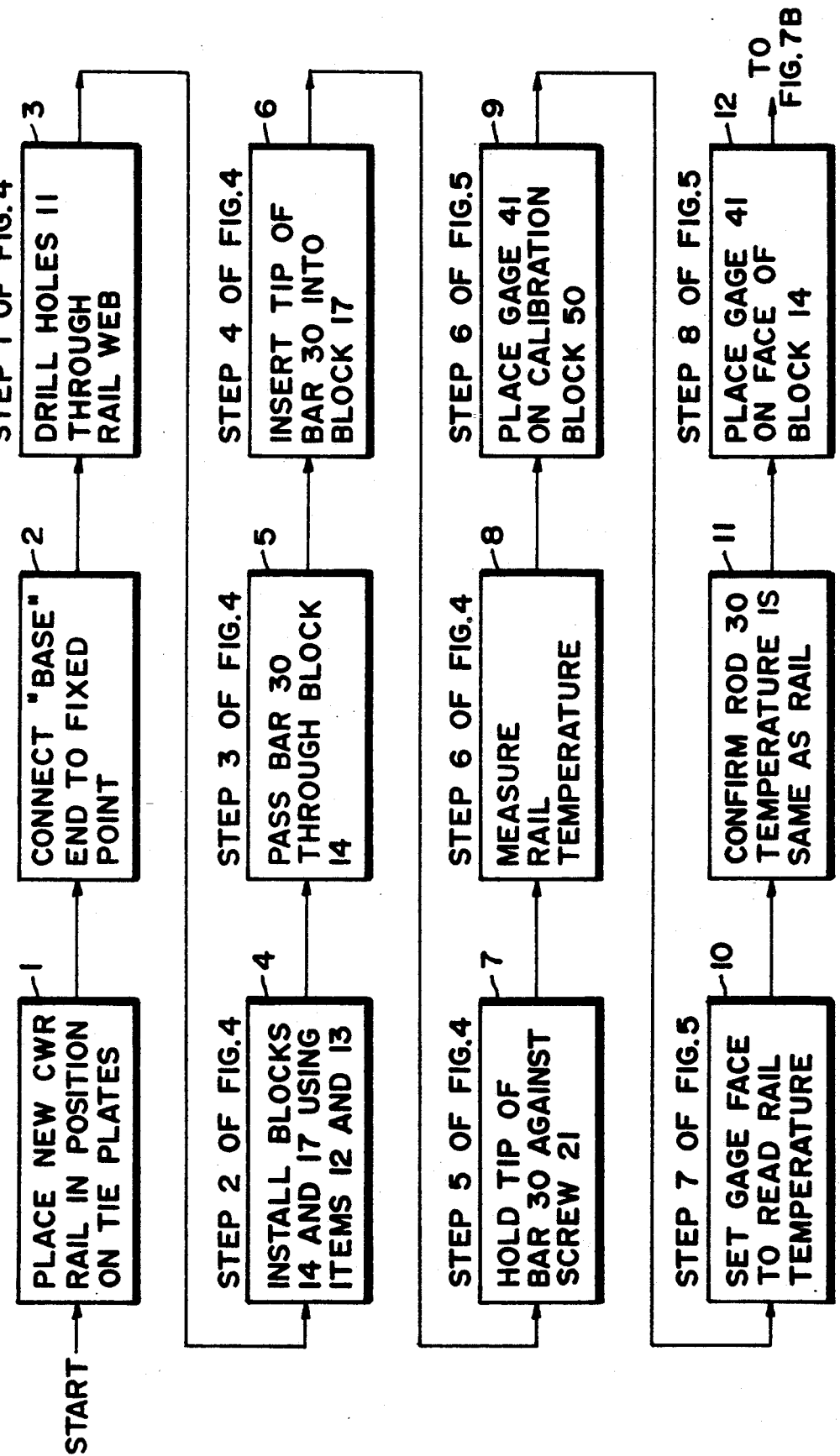

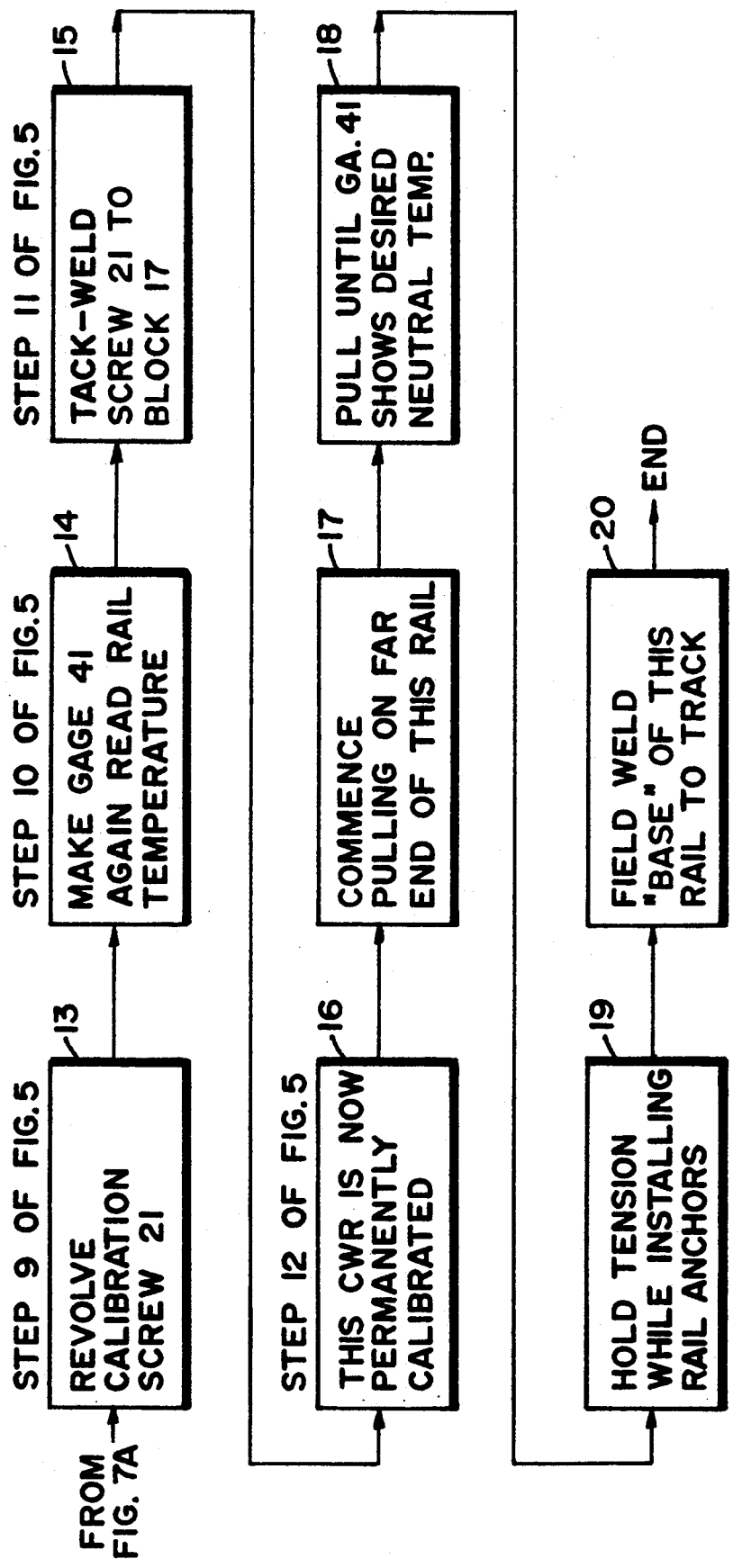

PROCESS FOR DETERMINING AND CONTROLLING RAILROAD RAIL'S NEUTRAL TEMPERATURE TO PREVENT TRACK BUCKLING AND RAIL FRACTURES

BACKGROUND—FIELD OF INVENTION

This invention relates to railroad rails, particularly to a process for monitoring and adjusting the neutral temperature of such rails so that track buckling and rail tensile fractures can be prevented.

DEFINITION OF TECHNICAL TERMS

Before discussing the prior art and the present invention, it will be helpful to define the terms used in such discussion.

Ballast: Tightly packed crushed stone, gravel, or cinders which is placed under, between, and at the ends of a railroad track's ties.

Barkhausen effect: A decaying sound response of the crystalline structure in steel after it has been subjected to an acoustic pulse.

Buckling: A track failure under compressive load. The track distorts and displaces in a perpendicular direction, with gross loss of track alignment.

Bunching: The agglomeration of elastically displaced portions of a rail near a point, caused by "running".

CWR: Continuously Welded Rail. Shorter pieces of rail, e.g., 12 meters (39 feet) long, welded end-to-end into long lengths (e.g., 1.6 kilometers) when installed in track.

Deflection: A situation which occurs when the track rail is prevented from changing length in response to temperature changes; that is, it is prevented from assuming the length that it would ordinarily attain at each temperature if not constrained by the track configuration.

Instantaneous Rail Temperature: The temperature indicated by a thermometer in contact with a rail.

Rail: One of a pair of rolled steel bars forming a track for wheeled vehicles.

Rail Anchor: A clamp installed on the rail base and bearing against the side of an adjacent crosstie to resist longitudinal rail movement.

Rail Joint: An assembly, including two steel members on either side of two rails to be connected, to span the gap between the rail ends. Threaded fasteners or special fastening systems are used to hold the members and rails together.

Rail's Neutral Temperature, Neutral Temperature, or RNT: When a rail is constrained against lengthening during hot weather or shortening during cold weather, there is always one temperature (the rail's neutral temperature) at which:
1. it has no tendency to change length,
2. it is not "deflected", and, consequently,
3. it has no internal force (or stress).

RNT Adjustment: A process in which a short length is added to or removed from a constrained railroad track rail for the purpose of changing the temperature at which there is no "deflection".

Railroad Track: An assembly consisting of ties, two rails, rail joints, rail spikes, ballast, earthen (usually) subgrade, and ancillary devices, such as rail anchors and tie plates.

Running: A condition in which there is an elastic longitudinal displacement of an intermediate portion of a long railroad rail in which it creeps or slips (moves) longitudinally relative to its rail anchors and other portions of the track.

Stress or Unit Stress: The total load or force acting on a rail divided by its cross-sectional area. In American practice the stress or unit stress is usually measured or stated in pounds per square inch (psi).

Stretching: An elastic longitudinal displacement (running) of an intermediate portion of a long railroad rail away from a point on the track, which elongates (stretches) the intervening portion of that rail.

Stress Relieving: A term of art commonly used in the American railroad industry to mean an upward adjustment of RNT.

Structure: A special track-related construction which gives an associated length of track increased longitudinal fixity, such as a railroad bridge, an at-grade crossing, and special trackwork, such as a track switch or an at-grade crossing of two tracks. Near a "structure" the rails are more constrained against running.

Tie, Crosstie, or Sleeper: A transverse component of track, usually of wood, to which the two rails are fastened.

Tie Plate: A metal plate interposed between a rail or other track element and a tie for spreading the downward train forces over a larger area of the tie's surface.

BACKGROUND—DISCUSSION OF PRIOR ART

An earlier type of track construction (and present-day secondary tracks, including many sidings and industry tracks) included numerous individual track rails, often of 12 meter (39 foot) length, fastened together end-to-end by elements called rail joints or joints. With this type of track construction, adjacent rails were usually spaced apart with a small gap (e.g., 3 mm or ⅛ inch). To a large extent the gap accommodated the expansion and contraction of the rails in response to temperature changes.

When CWR (continuous welded rail) was introduced the rail's tendency to change length with changing temperatures became much more of a problem. This is because with CWR, most rail joints are eliminated by welding the individual track rails together end-to-end, often into lengths of approximately 1.6 kilometers (one mile). This very long rail has no gaps to accomodate its tendency to shorten or lengthen with changes of temperature. If a 1609 meter (one mile) long rail were free to contract and expand with changing temperatures, its length would change by about 1.05 meters (41.2 inches) with a 56 degree C. (100 degree F.) temperature change.

Rails Are Constrained

The railroads have developed track configurations in which the rails are constrained longitudinally by a multitude of rail anchors clamped to the rails and bearing against the sides of the crossties (ties). The rail/tie portion of the track structure is in turn principally constrained longitudinally against expansion and contraction, and laterally against buckling, by the configuration and maintenance of the ballast. Ballast usually consists of tightly packed crushed rock or cinders between the top of the subgrade and the bottoms of the ties, tamped into the spaces between the ties, and also packed in a lateral direction for a distance of about 30 cm (one foot) against the ends of the ties.

Virtually no other long man-made metal construction is built this way. For example, steel-reinforced roadway paving usually has expansion joints, above-ground pipelines have expansion loops, long bridges have provision to accommodate expansion and contraction, suspended electrical transmission lines always have slack between their supports, and so forth. And as mentioned above, all railroads were formerly built with gaps in the rails which accommodated expansion and contraction.

But for railroads, the benefits of joint-free rail are considered worthwhile despite the attending problems. Track joints have always been high maintenance items, and there is an impact on the wheel bearings and related equipment on the rail vehicles every time they pass over a joint (causing the well known "clickety-clack" of trains), which accelerates the wear and deterioration of both the vehicles and the track.

Since joint-free track construction normally prevents the rails in CRW track from lengthening, shortening, or buckling in response to temperature change, there is an elastic deflection of the rail along its length, which is proportional to the temperature change. Deflection does not mean that the rail bends or moves, but that it is prevented from freely changing length in response to temperature changes. In a deflected state, the rail is under an axial load and has internal force.

Rail's Neutral Temperature (RNT)

From the time it is manufactured until it becomes part of a track, a length of railroad rail is free to lengthen or shorten with changing temperatures, as dictated by the physical properties of steel. After it becomes part of a typical CWR track assembly, it is constrained as discussed above, and it is no longer able to lengthen or shorten in response to temperature changes. Thus it is sometimes said to be "locked" to the earth's surface. At temperatures which are cooler than the rail's neutral temperature (RNT), the rail is stretched and has an internal tensile force. At temperatures warmer than the RNT, the rail is squeezed and has an internal compressive force.

Such a track rail is deflected and therefore under an axial load virtually all of the time. However, there is always one intermediate temperature at which the rail is not deflected. Since the rail is not deflected at this temperature, no deflection-related internal axial load is present. In the American railroad industry, this temperature is called the rail's neutral temperature (RNT). It is a term or benchmark used by the industry to define and control the relationship between a track rail's instantaneous temperature, which changes throughout the year, and the resulting internal axial loads which are temperature-related and deflection-related.

Temperature-Related Track Failure Modes A longitudinally compressed structural element which is long in comparison to its width is called a slender column. Its failure mode under compression is usually to distort, displace, and fail (buckle) in a lateral direction at or near its midpoint. Buckling is not like a failure of the column's material, e.g., by crushing; rather, a compressed slender column buckles because it becomes structurally unstable. Once failure has begun the column will continue to displace, yield, and eventually collapse, even at constant load.

Railroad track at elevated temperatures is subject to large longitudinal compressive axial loads and it tends to behave like a slender column. Its typical failure mode under excessive compressive load is also to distort, displace, and buckle in a lateral direction, with gross loss of alignment. Once started, track buckling continues until the local compressive axial loads are greatly alleviated. As is the case with a column, buckling does not occur because the strength of the steel rails has been exceeded; it occurs because the stability of the track has been overcome by the presence of large internal compressive axial forces in the rails.

As long as there have been steel and iron railroad rails, there have been occurrences of track buckling associated with elevated temperatures. Each year in the United States there are a number of incidents of high-temperature-related track buckling which sometimes cause dangerous and expensive train derailments and personal injuries and even loss of life.

Accident/Incident Bulletin 157 for Calendar Year 1988, issued by the United States Department of Transportation, Federal Railroad Administration, states that during 1988 there were 384 train accidents resulting from track geometry defects. The total damage costs were reported to be $22,663,707, of which irregular track alignment (buckled) was deemed responsible for $10,671,170 or 47%. The next highest total (wide gage resulting from defective or missing crossties) was $4,149,335 or 18% of damage costs. The remaining damage costs (34.6%) were spread among train accidents attributed to ten other types of track geometry defects.

The relative damage costs per train accident attributed to track geometry effects are another measure of the adverse impact of buckled track:

| Accident Cause | Number of Accidents in C.Y. 1988 | Average Cost per Accident |
| --- | --- | --- |
| All Track Geometry Defects | 384 | $59,020 |
| Buckled Track | 63 | $169,383 |
| All Other Track Geometry Defects | 321 | $37,360 |
| All Defects in Track, Roadbed, and Structures | 952 | $61,231 |

CWR has exacerbated this problem, not created it.

Another condition which further increases the tendency of the track to buckle is the presence of a track curve. A curve is, in effect, a place where the track, if considered as a column, is already bowed. At elevated temperatures, high compressive forces can cause the alignment at a curve to assume a "more displaced" condition, with progressively increasing loss of stability, eventually resulting in buckled track.

It is known that good track design and maintenance will reliably prevent track buckling when the difference between the RNT and the instantaneous rail temperature is less than about 19 degrees C. (35 degrees F.). That is; when the instantaneous rail temperature is less than about 19 degrees C. higher than the RNT, the track is not likely to buckle.

But when the difference exceeds 19 degrees C., there is a high risk of track buckling. This happens when the internal compressive force in the rails becomes so large that the ballast and related parts of the track can no longer stabilize the rail/tie alignment, and the track fails by buckling.

At the other extreme—cold weather—tensile forces cause failures called pull-aparts in which the rail steel itself fails in tension and the rails break in two. Pull-aparts are considered less dangerous than track buckling because (1) a pull-apart usually initiates a train signal "stop" indication due to interruption of the electric signal circuit, and (2) a pull-apart does not affect track alignment in the way that buckling does.

The greater the difference between the instantaneous rail temperature and the RNT, the greater the deflection and, hence, the greater the deflection-related internal force. A RNT can be lowered after the rail is installed in track, e.g., because the rail has run. If the RNT has been lowered, the difference between the hottest instantaneous rail temperature and the RNT is increased and the likelihood of track buckling during hot weather is increased.

When a rail runs and the RNT is lowered at one location, there is almost always a concomitant rise of the RNT at another location. Where the RNT is raised, the likelihood of a pull-apart is increased during cold weather because the difference between the coldest instantaneous rail temperature and the RNT has increased and the internal deflection-related forces will be greater. In both cases the deflection-related forces are greater because the changing of the RNT has increased the difference between the RNT and the instantaneous temperature at which failure may occur.

When a pull-apart is repaired, American track maintenance personnel usually weld-in a new section of rail several feet long, e.g. one meter long, in conformance with the standards of the American Railroad Engineering Association. The rail section being repaired might only need to be lengthened by a few inches, (e.g., 10 cm) or a foot (30 cm), but a longer gap is made and a longer new piece of rail, e.g., three feet (one meter) is used to separate the necessary two field welds in order that they will be of good quality.

Procedure For Establishing the Rail's Neutral Temperature (RNT)

As mentioned above, it is known that good track design and maintenance will reliably prevent track buckling in hot weather when the difference between instantaneous rail temperature and the RNT is no more than about 19 degrees C. Most American railroads specify RNT standards for track with CWR for each geographic locale. It is usually a goal to limit the difference between the rail's usual maximum summer temperature and the RNT to approximately 17 degrees C. (30 degrees F.). This limits the buildup of longitudinal compressive forces during hot weather in an attempt to prevent track buckling. It is also usually a goal to keep the RNT as low as practicable to prevent pull-aparts, commensurate with the need to prevent track buckling.

The difference between the lowest-occurring weather temperature and the RNT is usually deliberately made to be much larger than the difference between the highest-occurring rail temperature and the RNT. This is because the internal tensile force required to cause a pull-apart is far larger than the compressive force required to cause the track to buckle as a slender column.

The railroad industry's present practice for initially establishing the RNT near its standard for a particular locale is to install the track rails and apply and set rail anchors on them on a day when the local temperature (and, hence, the rail temperature) is near the desired RNT. However, the instantaneous rail temperature may be raised artificially to a minor extent during installation if necessary to attain the desired RNT. This is done by heating the rail to raise its instantaneous temperature up to the intended RNT, prior to installing the rail anchors. The instantaneous rail temperature at the time the rail anchors are installed becomes the initial RNT after they are installed. Thereafter, since there was no deflection-related internal force in the rails prior to installing the rail anchors, the RNT tends to stay the same regardless of the instantaneous temperature of the rail. The RNT changes when running occurs.

Running

After installation, a rail can no longer readily change length in response to changing temperatures, and so it will be deflected at temperatures higher or lower than the temperature at which the rail anchors were installed.

A multiple-unit locomotive's driving wheels may exert a cumulative longitudinal or axial tractive force (parallel to the rails and the earth's surface) of 113,600 kilograms (250,000 pounds) or more on each rail when pulling a train upgrade. This tends to push the rail downhill. If a locomotive's wheels are used to brake a train travelling down the same grade, the combined wheel-to-rail longitudinal forces can again reach a level as high as 113,600 kilograms. In both cases the locomotive's wheels exert a force on the rail which tends to push it downhill. In addition, when a train's automatic air brake system is in use, every wheel on every car will be exerting a longitudinal force on its rail.

If the "lock" mentioned earlier, between the rail and the earth's surface, were perfect, the RNT would never change, and track buckling and pull-aparts would occur only with extreme temperatures.

But the connection between the rail and the earth's surface is not perfect because the rail often slips or creeps in a longitudinal direction relative to the rail anchors, and consequently the RNT can change after the rails and rail anchors are installed into the track assembly. This often occurs in rolling or hilly terrain in which the rail anchors are unable to exert sufficient restraining force to absolutely lock the rail in place.

The rail is able to move relative to the rail anchors mainly because their holding power, which depends entirely on friction, is limited. The frictional forces are in turn proportional to the force with which the rail anchors are clamped to the base of the rail, which in turn is limited by their required physical configuration and their material.

However, in addition to the train-imposed forces on the rail, the rail and rail anchors are also subjected to conditions of extreme vibration that usually accompany a train's passage. This vibration may actually reduce the holding power of the rail anchors.

The RNT changes when the longitudinal force in the rail exceeds the combined holding power of the multitude of anchors, and the rail "runs" by longitudinally slipping or creeping relative to the rail anchors. When the rail runs, all or portions of it become slightly longer and/or slightly shorter relative to points on the earth's surface.

Steel is an elastic material and a steel rail's elastic behavior along its principal axis can be likened to a long-length helical coil tension spring. If a length of railroad rail was rigidly connected only at its ends to an inelastic object such as the earth's surface, the steel's elastic characteristic would still permit an intermediate point to be longitudinally displaced, e.g., 2.5 cm (one inch) in a 1.6 kilometer (one mile) long piece of rail, relative to its ends. This can be likened to moving some of the hypothetical spring's intermediate coils in a longitudinal direction while both of its ends remain connected to a rigid object.

This longitudinal displacement of a portion of a rail is called running in the American railroad industry. The part of the rail toward which the portion is displaced is said to be "bunched", and the remaining part is said to be "stretched".

Even if initially there was no internal tensile or compressive force present in the rail (or the spring), a longitudinal movement of an intermediate portion would cause a compressive force to develop at one end connection, lowering the RNT there, and a tensile force to develop at the other connection, raising the RNT near that point.

If the rail were under a compressive load prior to the longitudinal displacement of an intermediate portion, then the displacement would cause the compressive force on one end to increase and the compressive force on the other end to decrease.

Similarly, if the rail were under a tensile load prior to the longitudinal displacement of an intermediate portion, then the displacement would cause the tensile force on one end to increase and the tensile force on the other end to decrease.

There would also be concomitant RNT changes in the latter two cases. These changes are related to the phenomenon called running.

Running usually manifests itself by a portion of the rail tending to move toward the bottom of a grade, and "bunch" there, which lowers the RNT in that location. The rail portion's movement toward the bottom of a grade also tends to "stretch" the rail near the crest of a grade, which raises the RNT near that point. This is why railroad people say, "Rail always runs downhill." Running is a potential problem mainly in specific types of terrain and in climates where there are extreme swings of temperature.

Bunching Bunching of the rail tends to become a more serious problem when there is what railroad people call a "structure" at or toward the bottom of a grade. Typical structures include bridges, highway road crossings, and special trackwork, such as track switches or at-grade crossings of two tracks. A structure tends to give its related track more longitudinal fixity than ordinary track, limiting the rail's ability to distribute longitudinal displacements over a long distance.

This concentrates the longitudinal displacement (bunches the rail) near the structure. The effect is to lower the RNT, which increases the difference between the RNT and the highest instantaneous rail temperature. When the difference exceeds the "risk threshold" of 19 degrees C. discussed above, the risk of track buckling becomes high any time the instantaneous rail temperature is high. In winter, the maximum instantaneous rail temperature is much lower than it is in summer, and track buckling is virtually nonexistent.

Stretching

The phenomenon called running also tends to cause the RNT of the rail to rise near the tops of hills. The failure mode associated with stretching is for the rail's steel to fail in tension from excessive tensile force accompanying very low (i.e., winter) temperatures. In summer, the minimum instantaneous rail temperature is much higher than it is in winter, and pull-aparts are virtually nonexistent.

Identifying Locations Where The Rail Has "Run"

In present-day railroad practice, a common method for reckoning whether RNTs have become too low, increasing the risk of buckled track, relies on the experience and judgement of a track maintenance person. At a hot time, e.g., 3 PM during a summer day, the track maintenance person will visit each track location which is thought to be at risk from depressed RNT, and inspect it. One indication of diminished RNT is a "wavy" appearance of a rail, which is the result of very large temperature-related internal compressive forces. This waviness is usually in a horizontal plane and each wave is short, e.g. just a meter or two (a few feet) in length. Normally, even during the cooler morning temperature, this waviness is not present or at least not noticeable.

There is no widely accepted practice for reckoning whether RNTs have risen so high near the crest of a hill that there is a high risk of pull-aparts during cold weather. It is necessary to wait until a failure actually occurs to learn that the RNT was too high.

Corrective Maintenance Associated With Running

Because running causes the RNT to change after the rails are installed, it periodically becomes necessary at some locations for track maintenance personnel to adjust the RNT. Track people often call this process, "stress relieving". "Stress relieving" is a misnomer because they are actually changing the rail's neutral temperature (RNT). After the adjustment, the internal forces in the rail will be lower at high temperatures and higher at low temperatures; or vice-versa. So stresses have not been reduced or eliminated; their relationship to the instantaneous rail temperature is all that has been changed: the arithmetic total of the temperature-related internal rail stresses from the lowest to the highest instantaneous rail temperature, at a given location over the course of an average year, will be the same.

If the experienced person looking for evidence of low RNTs reckons that the RNT is too low at a particular location, a track maintenance gang will "adjust" it. This is done by cutting the rail in two, removing a short section, e.g., 15 cm (six inches) and welding the rail back together. The rail anchors are then repositioned by removing and reinstalling them tightly against their respective ties for a considerable distance each direction from the site of the adjustment. This is done to establish (and endeavor to maintain) the new RNT.

There are shortcomings to this practice: the process depends entirely on the availability, on a timely basis, and the experience and good judgement of the person making the inspection. Secondly, this person does not have an objective way of determining what the RNT really is; it may not be unacceptably low. Also, the length of rail to be removed is often based on the judgement of the person supervising the track maintenance gang's adjustment procedure, and this person does not have any way to know the true RNT. Consequently, the amount of rail to be removed is usually decided by an educated guess.

Problems Because RNT Is Not Known

High-risk potential track pull-apart and buckling locations are usually well-known to track maintenance personnel. This is because there is usually a long history of "rail running"-related difficulties or failures at such locations. The history often manifests itself in the form of numerous field weld joints where pull-aparts have been repaired and/or "stress adjustments" have previously been made. At one location on an operating railroad this writer observed 22 field welds within 90 meters (300 feet) of a structure.

Very often too long a piece of rail is removed in the "stress adjustment" process, raising the RNT too much and precipitating a pull-apart near that location the following winter. The pull-apart may in turn be repaired by adding an excessively long piece of rail, resulting in the necessity for another RNT adjustment the following summer. Thus a "vicious cycle" of "overcorrections" sometimes occurs.

The need for repeated stress adjustments in many locations is also due in part to the rail continuing to run after each adjustment. Running continues to change the RNT but there is no practical way for the track maintenance personnel to monitor it so as to be able to re-correct it with a scheduled maintenance operation.

Prior Methods of Measuring Force or Stress

The prior art is replete with methods for determining the amount of force acting on a structural component and/or the resulting unit stress within the component. The commonest method is to measure the change of one or more dimensions of the component when a force is applied and then to perform a calculation(s) using known "stress analysis" principles and utilizing the known mechanical properties of the component's material(s) and the configuration and dimensions of the component to ascertain the magnitude of the force or stress.

Sometimes the component is "calibrated" by applying a known force and measuring the corresponding change of a dimension(s) through which, within the elastic range of the component's material (e.g., the range wherein the dimension will return to its original length when the force is removed) a relationship similar to the terms in a spring rate is established. This is done to empirically determine a linear relationship which defines the relationship between applied force and change of dimension. The relationship between applied force and the resulting internal stress in the component can be defined using this method, together with known types of stress analysis calculations.

Chapman, in U.S. Pat. No. 924,427, Jun. 8, 1909, entitled "Stress Indicator", describes an early example of a technique in which a change of a dimension of a component of a bridge is mechanically/hydraulically magnified in order to cause a pointer on a dial to express up to 40,000 pounds per square inch of unit stress. Chapman does not teach how the relationship between change of dimension and the increments of stress was established. Temperature-related changes in the component's baseline dimension would be essentially matched by temperature-related changes in the corresponding dimensions of Chapman's stress indicator. The bridge is not constrained against temperature-related changes of dimension. It indicates unit stresses which are related to changes in dimensions of the "calibrated" component, as load is applied.

Scott, in U.S. Pat. No. 1,641,295, Sep. 6, 1927, entitled "Load Indicator", describes an early example of the technique in which a component is "calibrated" by applying a known force and measuring the corresponding change of a dimension(s) so that a linear relationship is empirically determined which defines the relationship between applied force and change of dimension. Scott's indicator is intended for use on wooden derricks used in drilling oil wells. He teaches that the indicator's materials should be selected from among those which have essentially the same thermal coefficient of expansion as wood. If this were not done, the difference between the temperature-related change of length of the component and the corresponding temperature-related change of length of the Indicator would erroneously be expressed as a force.

Scott's Load Indicator does not express a load in any scale of engineering units, but rather on an arbitrary scale of zero to ten undimensioned units which relate to a portion of the drill apparatus's weight, as established by the driller based upon his experience. As is the case with the bridge discussed above, the derrick is not constrained against temperature-related changes of the dimensions of the "calibrated" component. It indicates loads on the drill point which are determined by the relationship between applied force and the force-related changes in dimension of the calibrated component. This is the relationship which was established by the calibration procedure mentioned above.

Rupert and Tyler, in U.S. Pat. No. 4,070,906, Jan. 31, 1978, entitled "Modified Roof Strain Indicator" shows a system of novel anchors and wires working in concert with a dial indicator to show a change of distance between the anchors. This change of dimension is an indication of changing structural conditions within the mine roof. The dimensions are expressed in English units as small as 0.001 inch (25.4 microns).

Electrical resistance strain gages have been used in conjunction with contact thermometers to develop a basis for computing the RNT. Together with well-known electronic apparatus, these can be calibrated to indicate zero force or unit stress at a time when a component or a railroad rail is at a known temperature and not subjected to any axial load. This is done by cutting the rail, as is done in newer procedures, and then performing the calibration. After the rail is welded back together and the rail anchors are reapplied and reset as discussed earlier, there may be a change in the distance measured by the gage, i.e., a strain, reflecting a longitudinal force acting on the rail.

Thereafter, the dimension will not be affected by changing temperatures because the rail is constrained against expanding or contracting in response to temperature changes. The only change in the dimension measured by the gage (i.e., the strain) will occur if the rail runs. Consequently it is necessary to perform calculations to ascertain the RNT, taking into account the physical properties of steel, the change in distance which occurred immediately after the calibration process mentioned above, and any further dimension change resulting from the rail's running, also discussed above.

The electrical resistance strain gage and the mechanical gage methods mentioned in the patents discussed above all rely on a changing dimension to indicate a force or stress. Since an installed CWR rail is constrained, there is no change of dimension to measure, except when it runs. In fact, the constraint is the very reason that changing temperatures cause internal forces to build up in rails.

Since there is ordinarily no dimensional change to measure, conventional methods cannot be utilized to indicate force or stress in the rail. The conventional methods can only indicate a dimensional change which occurs when the rail creeps or slips relative to its anchors and runs. Even this is difficult to measure and at present is virtually always done with electrical resistance strain gages of some sort. They are not really compatible with long years of service under the conditions that act on a railroad rail.

Consequently the RNT must be determined by calculations which are based on the various conditions and properties discussed above.

Another "change of dimension" principle has been used in attempting to determine stress in a railroad rail. It is known that when a metal object is deformed on one axis, e.g., by the application of a force, that there is a concomitant deformation on an axis transverse to it. The size ratio between the principal deformation and the accompanying transverse deformation is known as Poisson's ratio.

For steel, Poisson's ratio has been determined to be 0.303. This means that a temperature change of 100 degree F., which would change the length of a 1.6 kilometer (mile-long) piece of rail by about 105 cm (41.2 inches), would change the width of the head of a large rail (2 15/16 inches) by 14.7 microns (0.0005785 inches), or just over half of 1/1000th of an inch. A temperature change of only three degrees C. (five degrees F.), which is near the lower limit of acceptable sensitivity for RNT, would only produce a width change of 5% as much as the foregoing, or just under three one hundred thousandths of an inch (0.734 microns) of width change. While it is possible to measure distance changes this small, the rail surface would have to be carefully prepared and preserved at the point where the measurements would be taken. Measurements of this magnitude are really only suitable for closely controlled conditions such as in a laboratory.

In addition to the above, other principles which do not rely on a dimensional change to indicate a force or unit stress have been tried for ascertaining a RNT. These include ultrasonic sound and Barkhausen effect systems which attempt to determine the internal unit stress in the rail.

The Barkhausen effect has never been made practical for railroad field use since its electronic circuitry is extremely sensitive to capacitance in its cables, interference caused by electromagnetic fields present in a rail which accompany the small electrical currents associated with track signal systems, and so forth. Numerous attempts have been made to use ultrasonic sound pulses to measure internal stresses in a rail, but none has been developed to a point where it is considered practicable by the American railroad industry. This is because there are many variables associated with this art and it has not yet been developed to an acceptable level of reliability and accuracy.

Even if they can be made to work as intended, the above two schemes for determining internal unit stress will merely provide the basis for a series of calculations similar to those discussed earlier for determining RNT. Like the application and use of strain gages, these will require a special type and level of skill, which is not normally available among track maintenance personnel.

Also, all of the above methodologies rely on devices which are relatively delicate. If they were permanently installed in the track, they would be subject to inaccuracies from incorrect operation, loss of calibration, or damage from high levels of vibration, weather, and occasional impact from partially detached equipment or securement devices dragging along the track beneath passing trains.

Another problem with some types of scheme is that often there are stresses present in the rail which are not related to the rail's temperature. Most of the "high tech" systems measure the stress that is present in a very small length of rail; often approximately 3 mm (⅛ inch). At these short lengths, there may be a locked-in local stress caused by an anomaly during manufacture or a plastic deformation caused by subsequent handling, transport, installation, or use. On curved track there will be deformation-related stresses. After being in service for a while, rails become plastically deformed on their top surfaces, which leaves a locked-in compressive stress. The locked-in stresses can add to or subtract from the temperature-related stress, resulting in an incorrect RNT calculation.

Also, high-tech methods often require that the area to be read by the equipment be smoothed and polished to a high standard to eliminate the local surface perturbations in the rail's surface which are left by the manufacturing process. Selection of an appropriate location and preparation of the selected area also require technical skills not normally found among track maintenance personnel.

Every one of the above methodologies starts with learning the magnitude of a condition existing within a loaded component or the CWR rail itself, e.g., a changed dimension or an internal stress. From this knowledge the internal force, unit stress, or neutral temperature can be calculated using well known techniques.

Present State Of The Art

There are no generally accepted techniques or equipment for determining RNT at this time. That this is so is brought out in an article in the August 1989 issue of *Railway Age* magazine starting on page 43 and titled, "M/w equipment: What chief engineers want". The article reported the current thinking of the chief engineering officers of eight major U.S. and Canadian railroads.

A sidebar to that article, titled, "Tomorrow's m/w [maintenance of way or track maintenance] machines: A shopping list", (p.44) which was compiled with the help of the chief engineering officers. The third item, on a list of fifteen machines and other devices that will be needed for the future was, "—A rail stress analyzer that would work within a track structure to determine the type of destressing needed to attain the neutral temperature of the rail."

One major reason that there are no generally accepted techniques or equipment is that CWR rail is constrained against expansion and contraction. Since virtually all techniques for measuring load are based on the measurement of a changing dimension of the loaded member itself, and since the length of a CWR rail cannot change because it is constrained, conventional methods for determining axial load or stress are not normally applicable. While the determination of RNT is technically possible, the present known means are really suitable only for laboratory type conditions. Those specialized techniques that do exist require skills and knowledge which are virtually nonexistent among track maintenance personnel.

OBJECTS AND ADVANTAGES

Accordingly, several objects and advantages of my process are:

(a) to provide a process for determining the RNT which does not require calculations or mental steps;

(b) to provide a process for determining the RNT which can be carried out at any temperature or time of year;

(c) to provide a process for determining the RNT which will permit track maintenance personnel to monitor changing RNTs in order that they may adjust them as a planned maintenance activity before they reach a hazardous level;

(d) to provide a process for determining the RNT which can also be used in conjunction with a RNT adjustment operation in order that the correct amount of rail to add or remove to attain the desired new RNT can be determined objectively and without guesswork;

(e) to provide a process for determining the RNT in which the vulnerable, high-precision components are portable and can be taken away from a site when not in use;

(f) to perform the required measurement over a comparatively long distance in order to average-out or eliminate the effects of local anomalies that would reduce accuracy if measurement was made in a short distance;

(g) to infer the amount of temperature-related deflection in a constrained CWR rail by comparing a denoted portion of its length to an unconstrained stress free metal gage bar that is the same length when both are the same temperature and neither is under axial load. That is, the rail and bar are each stress-free.

(h) to provide a process for determining the RNT which can be installed, calibrated, and used by typical track maintenance personnel without requiring them to undergo special training;

Further objects and advantages are to provide a practical method which will facilitate the development of a body of knowledge defining the response of RNT to weather changes, track configuration and gradients, train operating practices, and so forth; and to provide the basis for alternative embodiments, e.g., in which the instantaneous RNT can be transmitted to other locations without human intervention.

Still further objectives and advantages will become apparent from a consideration of the ensuing description and accompanying drawings.

| REFERENCE NUMERALS IN DRAWINGS | | | |
|---|---|---|---|
| 10 | portion of a railroad rail | 11 | hole |
| 12 | bolt portion of a 2-piece rivet | 13 | collar portion of a 2-piece rivet |
| 14 | primary benchmark block | 15 | hole through block 14 |
| 16 | counterbore for head of rivet | 17 | secondary benchmark block |
| 18 | hole in block 17 | 19 | counterbore for head of rivet |
| 20 | threaded hole | | |
| 30 | gage bar | | |
| 41 | secondary length difference gage | 21 | calibrating screw |
| | | 40 | primary length difference gage |
| 43 | magnetic collar | | |
| 45 | dial indicator contact point | 42 | stem |
| 47 | temperature scale face of gage 41 | 44 | temperature scale face of gage assembly 40 |
| 49 | dial face rotation lock knob | 46 | dial indicator portion of assemhly |
| 51 | RNT simulating calibration hole | 48 | rail temperature thermometer |
| | | 50 | calibration block |
| | | 99 | gap cut in "stress relief" process |

DRAWING FIGURES

FIG. 1A shows a length or railroad rail with two holes drilled through its web in accordance with the present invention.

FIG. 1B is an exploded view of a rail and the components of a RNT measuring system in accordance with the present invention.

FIG. 1C is an exploded view which shows a portion of a rail and further detail of a secondary benchmark block's configuration, a calibrating screw, and the components of a two-piece attaching rivet in accordance with the present invention.

FIG. 1D shows a length of rail with the primary components of the RNT measuring system assembled in accordance with the present invention.

Figure 3B:
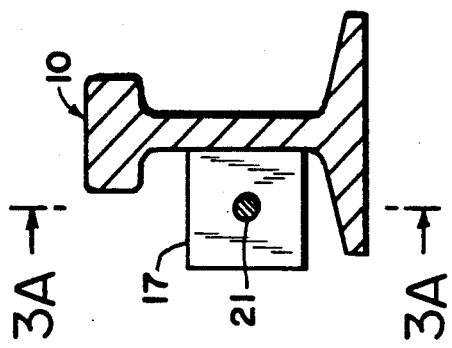
FIG. 3B shows plane through which the cross-sectional view of FIG. 3A is taken.
Figure 3D:
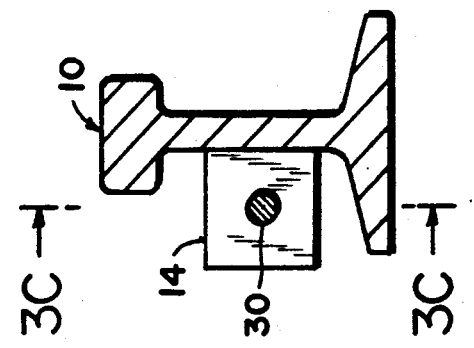
FIG. 3D shows plane through which the cross-sectional view of FIG. 3C is taken.
Figure 3A:
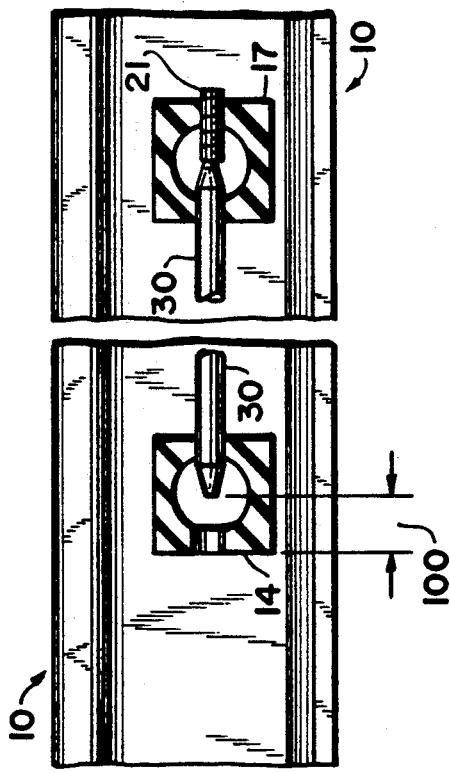
FIG. 3A shows the relationship during use between a gage bar, a primary benchmark block, and the secondary benchmark block shown in FIG. 1B while being used in accordance with the present invention.
Figure 3C:
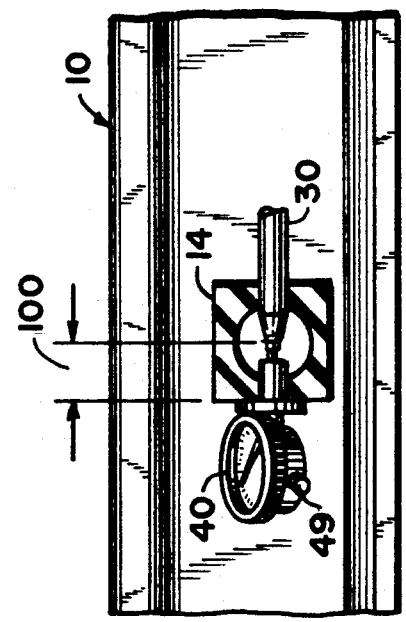
FIG. 3C shows the relationship during use between the gage bar, the primary benchmark block, and the stress relief gage assembly while being used in accordance with the present invention.

Note: the relationship during use between the gage bar, the primary benchmark block, and the RNT gage assembly is the same as shown for the gage bar, the primary benchmark block, and the stress relief gage assembly in FIG. 3C above, while being used in accordance with the present invention.

FIG. 4 is a functional flow block diagram defining the steps of a procedure which are used in accordance with the present invention for determining RNT where it is not known.

FIG. 5 is a functional flow block diagram defining the steps of a procedure which are used in accordance with the present invention for calibrating a permanent installation.

Figure 6:
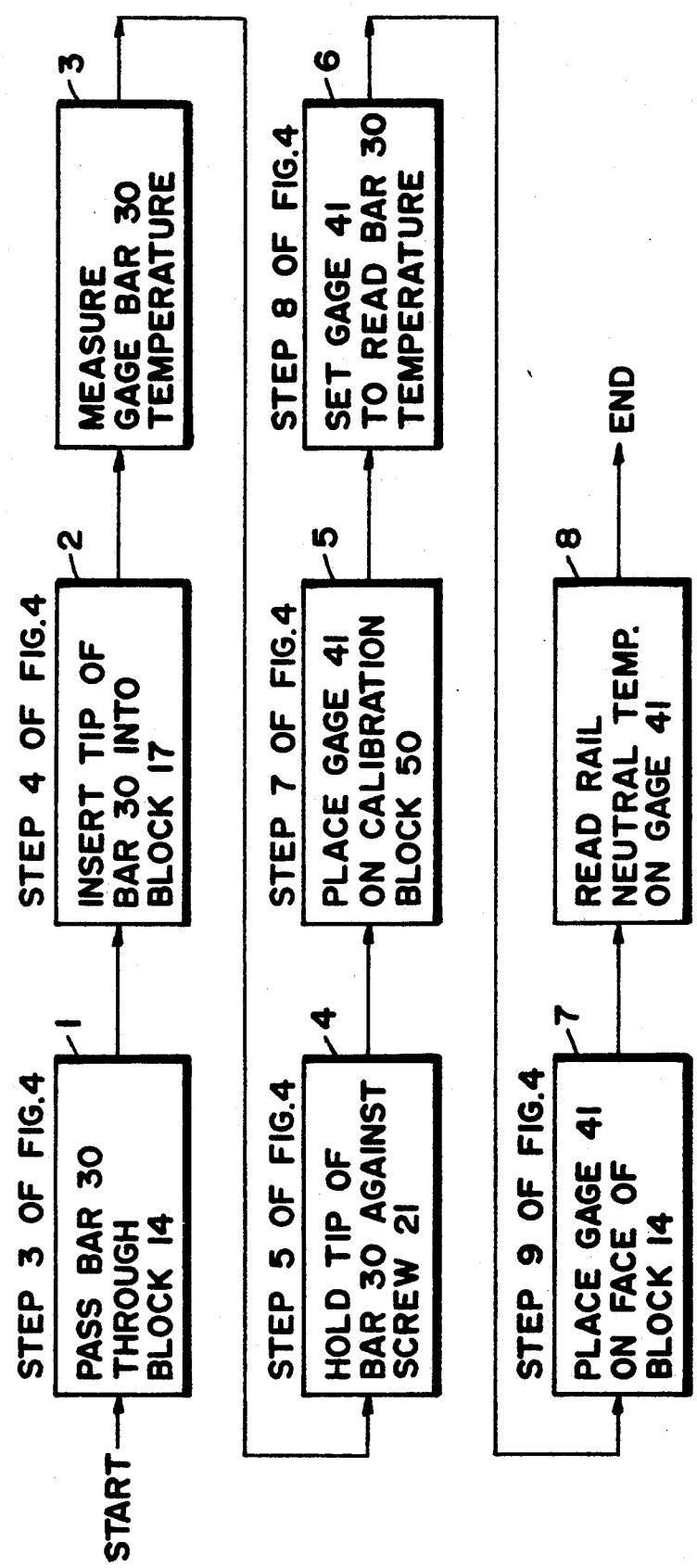

FIG. 6 is a functional flow block diagram defining the steps of the procedure which are used in accordance with the present invention for periodically monitoring RNT.

FIGS. 7A and 7B are a functional flow block diagram defining the steps of a procedure which are used in accordance with the present invention for establishing a RNT that is significantly lower that the instantaneous rail temperature during initial installation of a stalk of continuously welded rail.

THE BASIC PRINCIPLES

The basis of the present process for determining RNT is the comparison of the length of an unconstrained piece of steel with a demarcated portion (similar length) of railroad track rail which is constrained and thereby deflected at most temperatures because of the track's tie-in to the earth's surface. The demarcated portion of rail is calibrated to be substantially the same length as the gage bar when both are at the same temperature and neither is under axial load.

The unconstrained piece of steel might be thought of as a facsimile or analog of a section of CWR rail, in that it is similar in length, thermal coefficient of expansion, temperature, and every other condition and attribute, except that it is not axially constrained. In fact, it would be possible to use an actual length of unconstrained track rail for this purpose but the resulting extra size and weight would detract from the utility of the present process.

In a preferred embodiment the unconstrained piece of steel, hereinafter called the gage bar, has a length (the gage length) selected so that its change of length with change of temperature is a known analog of temperature. If constraints were removed, the "similar length" of rail would undergo the same change of length with changing temperature. This length is the gage length of the preferred embodiment of the present process. For example, a commonly used coefficient of thermal expansion for steel is 0.0000117 cm per cm per degree C (0.0000065 inch per inch per degree F). The dimension 0.01 mm is a common increment for precision metric dimension measuring instruments. In order for the gage bar's change of length to be 0.01 mm per degree C of temperature change, its length must be 0.01 divided by 0.0000117, or 854.7 mm.

Similarly, the dimension 0.0005 inch (0.0127 mm) is a common English dimensional increment for precision measuring instruments. In order for the gage bar's change of length to be 0.0005 inch (0.0127 mm) per degree F of temperature change its length must be 0.0005 divided by 0.0000065, or 76.92 inches (195.4 cm). This is the gage length of the preferred embodiment of the present process.

After the components of the RNT measuring system are installed and calibrated, the gage bar always represents the length (the gage length) that the counterpart piece of rail would be at any instantaneous rail temperature if the rail were not deflected by the track's connection to the earth's surface. When both are the same length, the rail is not deflected. Neither the rail nor the gage bar has an internal temperature-related force, and consequently the rail is at the RNT.

When the rail and the gage bar are not the same length, the difference is an analog of the temperature change which would cause the gage bar to lengthen or shorten until it became the same length as the counterpart piece of rail.

The same concept can be used in alternative embodiments of the process in which the difference in lengths are an analog of force in one rail, total force in the two rails of a piece of track, unit stress in the rail, etc., because each of these is proportional to the deflection of the rail.

OPERATION

A first description will be based on the hypothetical "stress-relieving" of a track rail judged to be at an unacceptably low RNT. For the purpose of clearly describing the process, it is postulated that the instantaneous temperature of the rail is 130 degrees F. (54 C.) and that the RNT is 70. Other uses of the system follow.

A. Process for Initially Determining Rail Neutral Temperature (RNT)

The process described below is used in accordance with the present invention when two conditions exist:

a. The RNT is unknown but is to be determined as part of a stress relief procedure (using the Fahrenheit temperature scale) and, b. It is desired that a permanent installation of the track-mounted components of the present process be made at a selected site (e.g., where rail running has been a problem) so that in the future the RNT can be readily monitored at that location, e.g., to determine whether the rail is still running at that location.

When this process is completed, the current RNT of an existing length of CWR rail, e.g., 1,500 feet, near the subject site will be known and a set of benchmark blocks will be installed, but not permanently calibrated. Since the RNT is known, the stress relief activity can be based on accurate knowledge of the existing RNT, without guesswork, and the target RNT can be achieved with far greater precision than previously possible.

The paragraph numbers in the following description relate to the numbered blocks in the functional block diagram shown in FIG. 4.

1. DRILL TWO HOLES 11 THROUGH RAIL. As shown in FIG. 1A, near the location where rail stress will be adjusted, a track maintenance gang will first drill two benchmark block mounting holes 11 through the web of a rail 10 at a point near the mid-height of the rail. The holes will be spaced apart 195.4 cm (76.92 inches) with a permissible dimensional variation of +/−3 mm (+/−⅛ inch). This is the gage length discussed above.

2. INSTALL BLOCKS 14 AND 17 USING ITEMS 12 AND 13. FIG. 1B is an exploded view which shows benchmark blocks 14 and 17 that are next attached to the web of the rail using hex head cap screws and nuts, two-piece rivets 12 and 13, or other comparable fasteners which pass through the a hole 16 and a hole 19 respectively in the blocks and through holes 11 in the web of the rail. FIG. 1C shows block 17 and its related features in greater detail. A hole 18 penetrates block 17 from its surface into a counterbore 19. Coincident with hole 18, but penetrating the opposite surface of block 17 is a threaded hole 20 which accommodates a calibrating screw 21. Calibrating screw 21 permits fine adjustment of a distance 100, shown in FIGS. 3A and 3C, during calibration, to avoid the necessity for close dimensional tolerances in drilling holes 11 and in manufacturing blocks 14 and 17. After distance 100 is calibrated, it represents the demarcated portion of the rail. Benchmark blocks 14 and 17 are 7.6 cm (3 inch) cubes of steel or cast iron.

A similar view of the area near block 14 would look the same as FIG. 1C, except that a hole 15 is of constant diameter all the way through block 14. This diameter is the same as hole 18, and both are slightly larger in diameter than a gage bar 30, permitting it to be freely passed through. Also, the calibrating screw 21 is only used with block 17. Once installed, the two blocks are never removed from the track.

3. PASS BAR 30 THROUGH BLOCK 14. The gage bar 30 (FIG. 1B) is passed through the hole 15 in the block 14 to the entrance of the hole in block 17. As previously described, gage bar 30 is constructed of steel having the same coefficient of thermal expansion as the rail 10. For the RNT system which utilizes the Fahrenheit temperature scale, it is 1.75 cm (11/16 inches) in diameter and 76.92 inches (195.3768 cm) long. The gage bar's ends are tapered as shown in FIGS. 3A and 3C.

4. INSERT TIP OF BAR 30 INTO BLOCK 17. The tip of bar 30 is next inserted into hole 18 of block 17 until it touches calibrating screw 21 (FIG. 3A).

5. HOLD TIP OF BAR 30 AGAINST SCREW 21. During use the gage bar 30 is manually held firmly in contact with calibrating screw 21. The relationship of the above-mentioned components will then be as shown in FIG. 3A. The gage bar is now positioned relative to the benchmarks to permit the lengths of the bar and rail portion to be compared.

6. MEASURE RAIL TEMPERATURE. The instantaneous temperature of the rail is next determined using a rail thermometer (not shown) of the type used throughout the world's railroads. As mentioned above, in this example the instantaneous temperature is determined to be 130 degrees F. (54 C). The rail thermometer is also used to confirm that the temperature of gage bar 30 is essentially the same as the rail temperature.

Figure 2A:
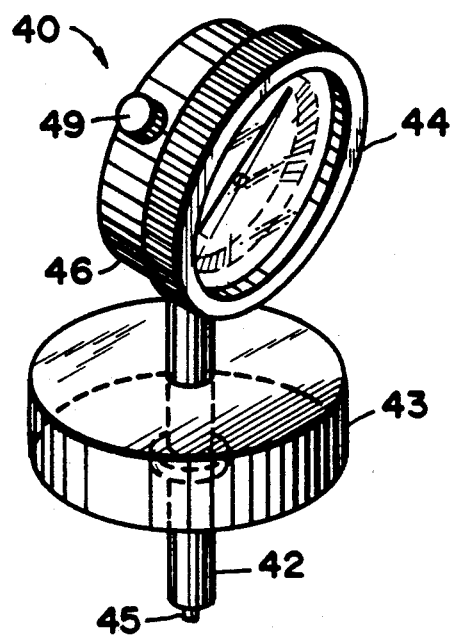
FIG. 2A shows the components of a primary (stress relief) gage assembly used in the present invention.
Figure 2B:
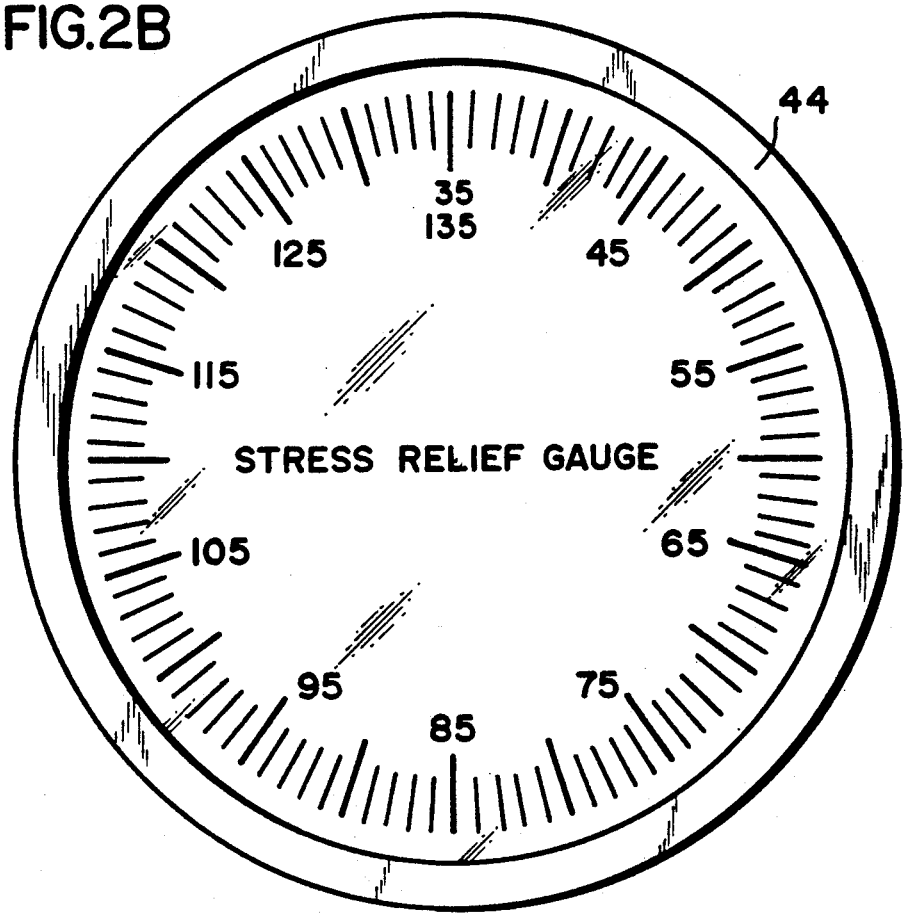
FIG. 2B shows details of the arrangement of a temperature scale dial face used on the primary (stress relief) gage assembly of FIG. 2A.
Figure 2C:
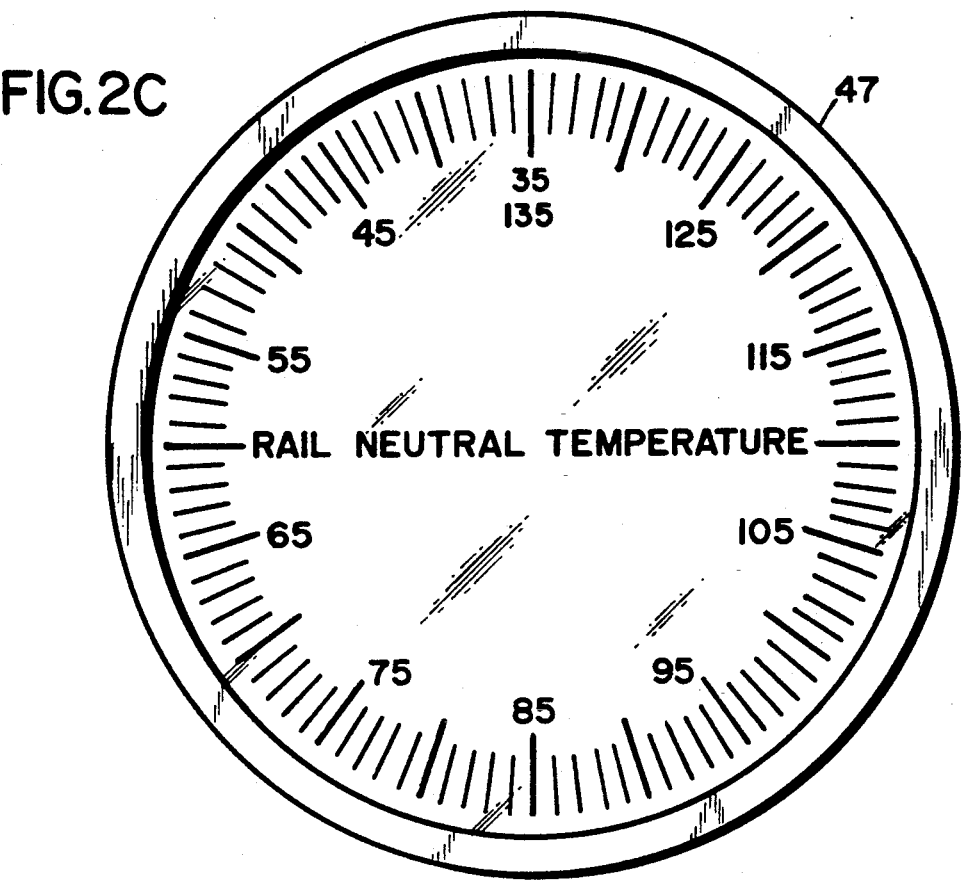
FIG. 2C shows details of the arrangement of a temperature scale dial face used on the secondary (neutral temperature) gage assembly of FIG. 2D.
Figure 2D:
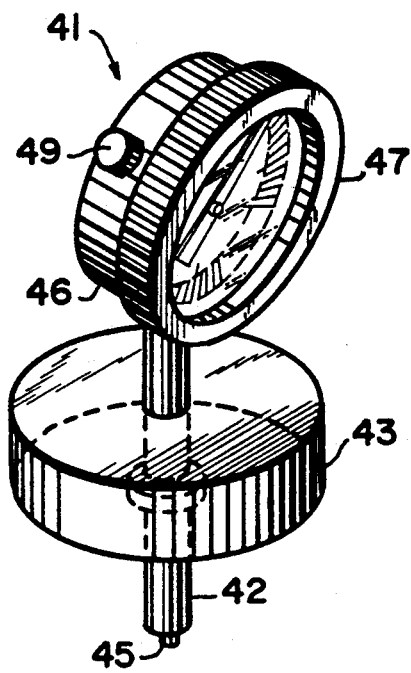
FIG. 2D shows the components of the secondary (neutral temperature) gage assembly used in the present invention.

7. PLACE GAGE 40 ON CALIBRATION BLOCK 50. Primary (stress relief) gage 40 is an assembly (FIG. 2A) based on a standard type of dial indicator 46, e.g., model 655-111J manufactured by the L. S. Starrett Company, Athol, Mass. All such dial indicators have a rotatable dial face with locking means 49 to facilitate calibration. The gage assembly also includes a magnetized ring 43 to hold it in place during use in accordance with the present invention, a stem 42 to orient it with a hole in a calibrating block, a specially graduated and annotated dial face 44 (FIG. 2B), and an extended contact point or plunger 45 enabling it to "reach through" the stem and touch the bottom of a hole in the calibrating block.

Figure 2E:
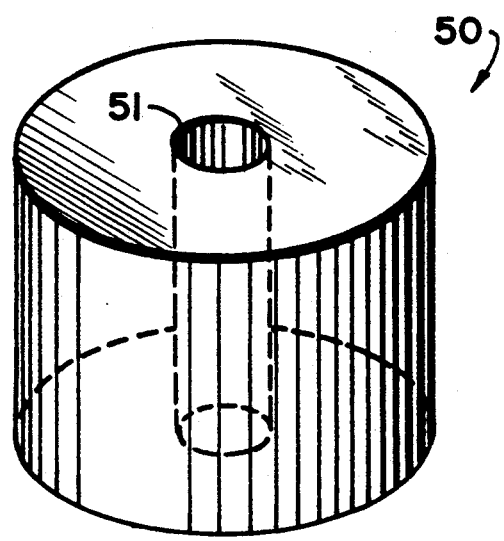
FIG. 2E shows a calibration block used in calibrating either gage assembly in accordance with the present invention.

The calibrating block 50 (FIG. 2E) is used in accordance with the present invention to permit the dial face of the gage assembly to be rotated so that the indicating hand of the dial indicator points at a specific temperature when the distance from the bottom of the magnetized ring to the tip of the contact point is 1.500 inches. This distance is the set to be distance 100 when the rail is at its RNT. This is made possible by the hole 51 in the calibration block 50, which is manufactured to be 1.500 inches deep.

Figure 2F:
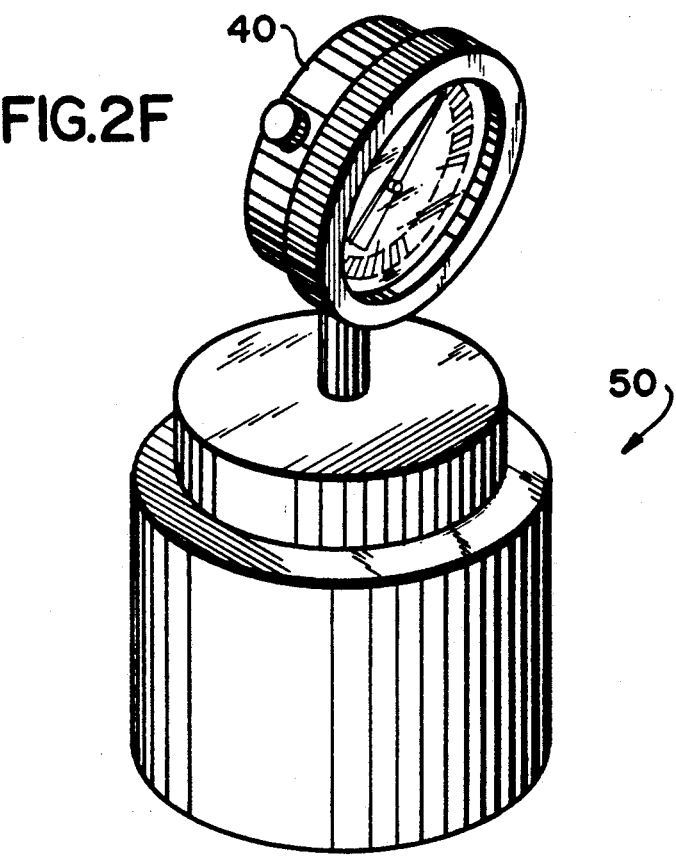
FIG. 2F shows relationship of the stress relief gage assembly and the calibration block during use in accordance with the present invention.

A relationship during use in accordance with the present invention, between the stress relief gage assembly 40 and the calibration block 50, is shown in FIG. 2F. It is used first with the calibration block 50 (FIG. 2E), and then with block 14 (FIG. 3C). Stem 42 of gage assembly 40 is inserted into hole 51 in calibration block 50 and the magnetic ring 43 is used to hold the gage firmly in contact with the calibration block. When stress relief gage assembly 40 is seated, the contact point 45 will be touching the bottom of hole 51 in calibration block 50, causing the hand of modified dial indicator 46 to move to, and remain at, a new position.

As noted earlier, the distance 100 is an arbitrary distance of 1.500 inches (3.81 cm) selected as a reference dimension that is used to set an axial relationship between the tip of the gage bar 30 and the corresponding face of block 14. This is set to be the size of dimension 100 when the rail 10 is not under any temperature related axial stress or force.

8. SET GAGE FACE TO READ RAIL TEMPERATURE. The dial face rotation locking knob 49 is then released and the dial face 44 of the modified dial indicator 46 is turned. The knob 49 is re-locked to secure the dial face when the number opposite the pointer hand is the same as the instantaneous rail temperature (Step 6), e.g., when the indicating hand points to 130 F (54 C). Thus, the gage is preset to an initial temperature value.

9. PLACE GAGE 40 ON FACE OF BLOCK 14. The primary (stress relief) gage assembly 40 is next removed from the calibrating block 50 and placed on the face of block 14 as shown in FIG. 1D. Its relationship with the other components will then be as shown in FIG. 3C.

10. REVOLVE CALIBRATION SCREW 21. Calibration screw 21 is next turned, which will cause the gage bar 30 to move axially and which will in turn cause the indicating hand of the stress relief gage assembly 40 to move.

11. MAKE GAGE 40 AGAIN READ RAIL TEMPERATURE. Calibration screw 21 is turned until the indicating hand on the stress relief gage assembly again points to the number 130, representing the instantaneous rail temperature. When this has been achieved, the depth of hole 51 of the calibration block 50, which is now also the distance 100 of FIGS. 3A and 3C (Step 7), will have been duplicated as the distance between the tip of bar 30 and the corresponding face of block 14.

The duplication will have been achieved through carrying out the calibrating processes of Steps 7 through 11 above.

12. CUT SUITABLE GAP IN RAIL (SEE FIG. 1D). A gap 99 is then cut in the rail a few meters (e.g., 3 meters or 10 feet) from the site where the stress relief adjustment procedure is being carried out (FIG. 1D. This gap must be sufficiently wide to permit the rail to lengthen slightly.

13. REMOVE APPROX. 8 METERS OF RAIL ANCHORS. Refer to FIG. 1D. All of a group of rail anchors (not shown) installed on the base of the rail, between the gap 99 and a point approximately 3 meters (10 feet) beyond block 14, are next released.

14. VIBRATE RAIL TO HELP ACHIEVE FREE LENGTH. This portion of the rail is next agitated using a rail vibrator of the type manufactured by Evans Railway Track-Work Company, Bethayres, Pa., or a comparable vibrator manufactured by one of their competitors. This will assist the portion of rail in reaching its unconstrained, force-free length.

15. READ RAIL NEUTRAL TEMP. ON GAGE 40. After the rail anchors are removed and the rail has been vibrated, (Steps 13 and 14) the affected section of rail will lengthen. This is so because in this example it was postulated that the instantaneous temperature was 130 F (54 C) and that the RNT was 70 F (21 C). Since the assumed RNT is lower than the assumed instantaneous temperature, this means that the rail was previously in compression and it would lengthen when the constraining rail anchors were released. At the same time, the gage bar 30 would not change length because it was never constrained. Consequently, distance 100 (FIG. 3A) would decrease.

The special dial face 44 (FIG. 2B) of the dial indicator is graduated into 100 increments of one degree F (0.55 C) each, from 35 F to 135 F (1.67 C to 57.2 C). Also, one revolution of the indicating hand of modified dial indicator 46 represents 0.050 inches of travel of its contact point, which is equivalent to 100 increments of 0.0005 per revolution. Therefore a change of 0.00005 inches in distance 100 will cause the indicating hand of modified dial indicator 46 to move by an amount representing one degree Fahrenheit.

As discussed above, the gage length used with the preferred embodiment of the present process was selected so that if a 76.92 inch (195.4 cm) length of unconstrained rail should change temperature by one degree F (0.55 C), its length would change by 0.0005 inches (0.0127 mm). This is also represented by the length of gage bar 30.

Referring to FIG. 3C: When distance 100 is decreased (difference in length of the bar and rail portion) contact point 45 will be pushed by gage bar 30 toward the face of block 14, causing the indicating hand of modified dial indicator 46 to rotate (because of the arrangement of its internal components) in a clockwise direction to thereby measure the difference in length. It will no longer point to 130 F (54 C) but will move to a new position at which it will point to 70 F (21 C) which represents the RNT at that location. In other words, the gage indicates or registers the RNT as the algebraic sum of the preset or initial temperature and the difference in length.

B. Process for Calibrating a Permanent Field Installation

The process described below is used after the above activities are completed, or at any time when a set of benchmark blocks is attached to an unconstrained (stress free) rail and ready to be permanently calibrated. The latter case could exist if a short length of rail was being outfitted with a set of benchmark blocks, the rail being intended, e.g., for installation in connection with repair of a pull-apart as discussed above.

The paragraph numbers in the following description relate to the numbered blocks in the functional block diagram shown in FIG. 5.

1. START AT END OF FIG. 4 PROCESS. The procedures for this operation depend upon the foregoing activities in which benchmark blocks 14 and 17 are installed but not calibrated to the RNT.

2. PASS BAR 30 THROUGH BLOCK 14. This step is the same as Step 3 of FIG. 4: Gage bar 30 is passed through hole 15 in block 14 to the entrance of the hole in block 17.

3. INSERT TIP OF BAR 30 INTO BLOCK 17. This step is the same as Step 4 of FIG. 4: The tip of gage bar 30 is next inserted into hole 18 of block 17 until it touches calibrating screw 21. (FIG. 3A).

4. HOLD TIP OF BAR 30 AGAINST SCREW 21. This step is the same as Step 5 of FIG. 4: Gage bar 30 is then held firmly in contact with calibrating screw 21. The relationship of the above-mentioned components will then be as shown in FIG. 3A. The bar is now positioned relative to the benchmarks for comparison of the lengths of the bar and the rail portion.

5. MEASURE RAIL TEMPERATURE. This step is the same as Step 6 of FIG. 4: The instantaneous temperature of the rail is next determined. It is also used to confirm that the temperature of gage bar 30 is essentially the same as the rail temperature.

6. PLACE GAGE 41 ON CALIBRATION BLOCK 50. This step is the same as Step 7 of FIG. 4 except that secondary gage 41 is used instead of primary gage 40: secondary gage assembly 41 is exactly the same as primary gage assembly 40 except that a special dial face 47 is used instead of special dial face 44. Dial face 47 is graduated from 135 to 35 degrees Fahrenheit (57.2 C to 1.67 C). The relationship between secondary gage assembly 41 and calibration block 50 is shown in FIG. 2F. Stem 42 of gage assembly 41 is inserted into hole 51 in calibration block 50 and the magnetic ring 43 is used to hold the gage firmly in contact with the calibration block. The hole in calibration block 50 is equal to distance 100. (FIGS. 3A and 3C).

When secondary gage assembly 41 is seated, contact point 45 will touch the bottom of hole 51 in calibration block 50, causing the hand of modified dial indicator 46 to move and remain at a new position.

7. SET GAGE FACE TO READ RAIL TEMPERATURE. This step is the same as Step 8 of FIG. 4, except that gage 41 is used instead of gage 40: Dial face rotation locking knob 49 is then released and dial face 47 of modified dial indicator 46 is turned. Knob 49 is re-locked to secure the dial face when the number opposite the pointer hand is the same as the rail temperature (preset or initial value).

As noted in Step 7 of FIG. 4, distasnce 100 of FIGS. 3A and 3C, which is also the same as the depth of hole 51 of calibrating block 50, is an arbitrary distance of 1.500 inches (3.81 cm) selected as a reference dimension that is used to set the axial relationship between the tip of the gage bar and the corresponding face of block 14. This is the size of dimension 100 when the rail 10 is not under any temperature related axial stress or force.

8. PLACE GAGE 41 ON FACE OF BLOCK 14. This step is the same as Step 9 of FIG. 4, except that gage 41 is used instead of gage 40: secondary (rail neutral temperature) gage assembly 41 is now removed from calibration block 50 and placed on the face of block 14, as shown in FIG. 1D. Its relationship with the other components will then be as shown in FIG. 3C.

9. REVOLVE CALIBRATION SCREW 21. This step is the same as Step 10 of FIG. 4, except that gage 41 is used instead of gage 40: Calibration screw 21 is next turned. This will cause gage bar 30 to move axially and in turn cause the indicating hand of the secondary (rail neutral temperature) gage assembly 41 to move.

10. MAKE GAGE 41 AGAIN READ RAIL TEMPERATURE. This step is the same as Step 11 of FIG. 4, except that gage 41 is used instead of gage 40. Calibration screw 21 is turned until the indicating hand on the RNT gage assembly again points to the number representing the instantaneous rail temperature.

11. TACK-WELD SCREW 21 TO BLOCK 17. This step is used to prevent the calibrating screw from moving in response to the intense vibration that is present in the rail whenever a train is passing. Any movement would result in loss of calibration and the rail would have to be cut again in order to permit the process to be repeated and the installation to be brought back into calibration.

12. PERMANENT INSTALLATION IS CALIBRATED. This is so because the depth of hole 51 of the calibration block 50 will have been duplicated as the distance between the tip of bar 30 and the corresponding face of block 14 (FIGS. 3A and 3C). See discussion under Step 7 of FIG. 6.

The duplication will have been achieved through carrying out the processes of Steps 6 through 10 above. The permanent calibration is now accomplished because it satisfies the definition of RNT: The temperature at which no temperature-related internal forces or stresses are present in the rail; and it satisfies the arbitrary size of dimension 100 (FIGS. 3A and 3C) which is set at 1.500 inches when rail is at its RNT.

C. Process for Periodically Monitoring Neutral Temperature

This process is the key one made possible by the present process. The above processes lead up to this one wherein the RNT can easily be monitored over a period of months or years without ever having to cut the rail or recalibrate the installation again. The monitoring process is simple and can be carried out by one person in a very short time to monitor any RNT that may be changing.

This capability will permit any necessary RNT adjustments to be carried out on a planned-maintenance basis, rather than forcing the track maintenance personnel to wait until a pull-apart occurs or until hot weather causes an indication that track buckling may be imminent, in order to know that a dangerous condition has developed.

The paragraph numbers in the following description relate to the numbered blocks in the functional block diagram shown in FIG. 6.

1. PASS BAR 30 THROUGH BLOCK 14. This step is the same as Step 3 of FIG. 4: Gage bar 30 is passed through hole 15 in block 14 to the entrance of the hole in block 17.

2. INSERT TIP OF BAR 30 INTO BLOCK 17. This step is the same as Step 4 of FIG. 4: The tip of gage bar 30 is next inserted into hole 18 of block 17 until it touches calibrating screw 21. (FIG. 3A).

3. MEASURE GAGE BAR 30 TEMPERATURE

4. HOLD TIP OF BAR 30 AGAINST SCREW 21. This step is the same as Step 5 of FIG. 4: Gage bar 30 is then held firmly in contact with calibrating screw 21. The relationship of the above-mentioned components will then be as shown in FIG. 3A. The bar is now positioned relative to the benchmarks for comparison of the lengths of the bar the rail portion.

5. LET BAR 30 TEMPERATURE EQUALIZE WITH RAIL 10. This step is necessary because errors would be introduced if the bar and rail were at different temperatures.

5. PLACE GAGE 41 ON CALIBRATION BLOCK 50. This step is the same as Step 7 of FIG. 4, except that gage 41 is used instead of gage 40. The relationship between rail neutral temperature gage assembly 41 and calibration block 50 is the same as that shown in FIG. 2F. Stem 42 of gage assembly 41 is inserted into hole 51 in calibration block 50 and the magnetic ring 43 is used to hold the gage firmly in contact with the calibration block. The hole in calibration block 50 is of a precise depth, equal to distance 100 in FIGS. 3A and 3C.

When rail neutral temperature gage assembly 41 is seated, contact point 45 will touch the bottom of hole 51 in calibration block 50, causing the hand of modified dial indicator 46 to move and remain at a new position.

6. SET GAGE 41 TO READ BAR 30 TEMPERATURE. This step is the same as Step 8 of FIG. 4, except that gage 41 is used instead of gage 40: Dial face rotation locking knob 49 is then released and the dial face 44 of modified dial indicator 46 is turned. Knob 49 is relocked to secure the dial face when the number opposite the pointer hand is the same as the rail temperature (preset on initial state).

7. PLACE GAGE 41 ON FACE OF BLOCK 14. This step is the same as Step 9 of FIG. 4, except that gage 41 is used instead of gage 40: RNT gage assembly 41 is now removed from calibrating block 50 and placed on the face of block 14 as shown in FIG. 1D. Its relationship with the other components will then be as shown in FIG. 3C.

8. READ RAIL NEUTRAL TEMPERATURE ON GAGE 41. Unless the rail is at its RNT when the gage is placed on the face of block 14, the difference between the length of the demarcated portion of rail, discussed above, and the gage bar will be measured by the gage such the indicating hand of gage 41 directly registers the RNT of the rail by moving an amount analogous to the difference between the instantaneous temperature and the RNT. The new position of the gage's indicating hand will cause it to point at the RNT of that location. In other words, the gage registers the RNT as the algebraic sum of the preset temperature and the difference in length.

D. Installation Process for Elevated Neutral Temperature

This process can be used with the present process for establishing a neutral temperature of a rail being installed, when the actual (instantaneous) temperature of the rail is significantly lower than the desired neutral temperature (RNT). This process can replace the awkward procedures now employed in which the rail is heated to the desired RNT or the rail is stretched.

When the rail is heated in connection with this activity, it is very difficult to raise the whole stalk of (say) ¼ mile length to the desired temperature and to hold it uniformly at that temperature until the rail anchors can be installed and set. The greater the difference between the instantaneous rail temperature and the target rail neutral temperature (the target RNT), the more difficult this becomes. Consequently, the amount of temperature difference that can be overcome in this way is severely limited by the rate of heat loss.

At present, there is no objective way for a track gang to determine the RNT which corresponds to each amount of stretch of a rail, when that principle is being used for establishing an RNT. The present process can be used to overcome that lack.

The paragraph numbers in the following description relate to the numbered blocks in the functional block diagram shown in FIG. 7A and 7B.

1. PLACE NEW CWR RAIL IN POSITION ON TIE PLATES. The length of new CWR is first placed on the track's tie plates in preparation for installation.

2. CONNECT "BASE" END TO FIXED POINT. The end of the stalk of CWR which is closest to the existing corresponding rail is then connected to a strong rigid point. Usually this strong point would be the corresponding rail.

3. DRILL TWO HOLES 11 THROUGH RAIL. This step is the same as Step 1 of FIG. 4.

4. INSTALL BLOCKS 14 AND 17 USING ITEMS 12 AND 13. This step is the same as Step 2 of FIG. 4.

5. PASS bar 30 THROUGH BLOCK 14. This step is the same as Step 3 of FIG. 4: Gage bar 30 is passed through hole 15 in block 14 to the entrance of the hole in block 17.

6. INSERT TIP OF bar 30 INTO BLOCK 17. This step is the same as Step 4 of FIG. 4. The tip of gage bar 30 is next inserted into hole 18 of block 17 until it touches calibrating screw 21.

7. HOLD TIP OF bar 30 AGAINST SCREW 21. This step is the same as Step 5 of FIG. 4. Gage bar 30 is then held firmly in contact with calibrating screw 21.

8. MEASURE RAIL TEMPERATURE. This step is the same as Step 6 of FIG. 4. The instantaneous temperature of the rail is next determined. The rail thermometer is also used to confirm that the temperature of gage bar 30 is essentially the same as the rail temperature.

9. PLACE GAGE 41 ON CALIBRATION BLOCK 50. This step is the same as Step 7 of FIG. 4 except that gage 41 is used instead of gage 40.

When rail neutral temperature gage assembly 41 is seated, contact point 45 will touch the bottom of hole 51 in calibration block 50, causing the hand of modified dial indicator 46 to move and remain at a new position.

10. SET GAGE FACE TO READ RAIL TEMPERATURE. This step is the same as Step 8 of FIG. 4 except that gage 41 is used instead of gage 40. Dial face rotation locking knob 49 is then released and the dial face 47 of modified dial indicator 46 is revolved. Knob 49 is re-locked to secure the dial face when the number opposite the pointer hand is the same as the instantaneous rail temperature.

11. CONFIRM BAR 30 TEMPERATURE IS SAME AS RAIL. This step is necessary because errors would be introduced if the bar and rail were at different temperatures.

12. PLACE GAGE 41 ON FACE OF BLOCK 14. This step is the same as Step 9 of FIG. 4, except that gage 41 is used instead of gage 40. RNT gage assembly 41 is now removed from calibrating block 50 and placed on the face of block 14 as shown in FIG. 1D. Its relationship with the other components will then be as shown in FIG. 3C.

13. REVOLVE CALIBRATION SCREW 21. This step is the same as Step 10 of FIG. 4, except that gage 41 is used instead of gage 40. Calibration screw 21 is next turned, which will cause gage bar 30 to move axially and which will in turn cause the indicating hand of RNT gage assembly 41 to move.

14. MAKE GAGE 41 AGAIN READ RAIL TEMPERATURE. This step is the same as Step 11 of FIG. 4, except that gage 41 is used instead of gage 40. Calibration screw 21 is turned until the indicating hand on the RNT gage assembly again points to the number representing the instantaneous rail temperature.

15. TACK-WELD SCREW 21 TO BLOCK 17. This step is the same as Step 11 of FIG. 5. This step is used to prevent the calibrating screw from moving in response to the intense vibration that is present in the rail whenever a train is passing. Any movement would result in loss of calibration and the rail would have to be cut again in order to permit the process to be repeated and the installation to be brought back into calibration.

16. THIS CWR IS NOW PERMANENTLY CALIBRATED.

17. COMMENCE PULLING ON FAR END OF THIS RAIL. This operation is performed using equipment manufactured for this purpose.

18. PULL UNTIL GAGE 41 SHOWS DESIRED NEUTRAL TEMPERATURE. As the opposite end of the rail is pulled it will stretch and elongate. Gage bar 30 will not change length because it is not subject to any force as a result of this action. Consequently the axial relationship between the bar and the denoted section of rail will change. This change will be reflected by changes in the indication on the face of gage 41, and each new reading will represent the new RNT that is associated with that amount of elongation.

19. HOLD TENSION WHILE INSTALLING RAIL ANCHORS. When the target RNT is indicated by gage 41, the pulling is stopped and the rail is held at that length. While in this stretched condition the rail anchors are installed to hold the rail in order to maintain the target RNT.

20. FIELD WELD "BASE" OF THIS RAIL TO TRACK. This activity is carried out in the customary way to complete the installation of the stalk of rail at a RNT higher than the rail's instantaneous temperature.

CONCLUSIONS, RAMIFICATIONS, AND SCOPE

Thus the reader will see that the process provides valuable new safety and convenience to railroads through the easy and accurate measurement and control of the RNT.

The present process utilizes measurement of the actual length of an unconstrained gage bar at any instantaneous temperature to infer the temperature-related length change that would take place if a constrained CWR rail were released at that temperature. This circumvents the difficulties that occur when trying to determine the RNT by examining other properties of a rail that is constrained against length change.

As the rail's instantaneous temperature departs farther and farther from the RNT, the difference between the length of the gage bar and the corresponding (denoted) portion of the rail will become greater and greater. This is so whether the rail is warmer than the RNT or cooler than the RNT. Consequently, the RNT can be determined regardless of rail temperature with the result that potential hot-weather rail buckling can be predicted in winter or any other time, and potential cold-weather pull-aparts can be predicted in summer or any other time.

All of the precision equipment is portable and may be removed from the measurement site, where it could be damaged or vandalized when not in use.

Being portable, this precision equipment, which constitutes the high cost components, can be used to determine RNT at numerous locations, thereby prorating its cost over many permanent installations.

The components which are permanently installed in the track at various locations are designed and installed in such a way that they are resistant to damage from impacts, vibration, weather, and vandalism which commonly occur on railroad property.

No specialized technique or technology is required to install or use this new art. Present track personnel will be able to quickly learn to use it.

There are no close tolerances in the manufacture or installation of the intrack components of the process; instead, calibration means is incorporated which is permanently fixed in place after initial installation and never has to be used again.

The process will provide the local RNT directly in degrees Fahrenheit or Celsius without calculations or mental steps at any time of year or any instantaneous rail temperature. This is also true of other temperature related characteristics or engineering terms which, as an alternative, the equipment may be configured to express.

Once the permanent apparatus is installed on the rail and calibrated, it will be a 5-minute job to put the portable components in place and read the RNT (or other temperature-related characteristics or engineering terms) every few weeks or months to monitor changes if the rail continues to run.

The rail never has to be cut or calibrated again, and unless it is physically damaged, the installation will remain useful until the rail is worn out.

A slightly longer piece of rail (e.g., ten feet or three meters) can be prepared and stored with the present process's benchmark blocks already installed and calibrated. If one of these is installed instead of the plain piece of rail described above, or in connection with a high-temperature RNT adjustment, no further extra work is required to complete an installation of the present process's apparatus. In either case the overall change in the length of the rail can be kept to the required amount; that is, the existing rail need not be lengthened by ten feet simply because that is the length of the specially prepared length of new rail.

Substantially different compressive forces in the two rails (or compressive force in one and tensile in the other) increase the tendency of the track to buckle. With existing practice, there is no simple way of knowing whether this condition exists, but by installing the apparatus of the present process on both rails at a given site, the determination becomes highly practicable. Such new knowledge will be invaluable in developing a broader base of knowledge regarding the behavior and implications of RNT.

The process permits the rail's RNT to be directly read without any calculations or mental steps.

While my above description contains many specificities, these should not be construed as limitations on the scope of the process, but rather as an exemplification of one preferred embodiment thereof. Many other variations are possible. For example the process may be designed to indicate other temperature-related characteristics such as force in one rail, force in the track (two rails), unit cross-sectional stress, various scales or engineering units (e.g., temperature Celsius or Fahrenheit) and so on.

As an example of a unit stress embodiment, the gage is configured to measure the difference in length of the gage bar and the demarcated rail portion when each is at substantially the same temperature. The gage registers this difference on a unit stress scale that corresponds to the characteristic length variation of the gage bar. That is, the gage's unit stress scale is correlated to the relationship of the gage bar length change with temperature. A compressive unit stress is registered if the rail portion is shorter and a tensile unit stress is registered if the rail portion is longer than the gage bar.

Also, it would be obvious to use electrical resistance strain gages as the length definition media including analogous electronic apparatus for demarcating and comparing the lengths of the gage bar and the rail portion, and converting the result to express the neutral temperature on a scale for comparing an unconstrained length of steel (i.e., the gage bar) with a similar length of constrained rail when using the present process, e.g. when testing or research was being carried out, or as the basis of an electronic system for automatically transmitting RNT data to a remote location.

Accordingly, the scope of this process should be determined not by the embodiments illustrated, but by the appended claims and their legal equivalents.

I claim:

1. Apparatus for determining unit stress in an axially constrained rail in a railroad track, comprising:
   a metal gage bar having substantially the same coefficient of thermal expansion as the rail, the length of the bar being selected such that any temperature-related change in length is a known analog of internal unit stress that results from an equal change in length caused by an external force;
   primary and secondary benchmarks attached to the rail to demarcate a portion of the rail which is equal to the length of the gage bar when the bar and the rail are each stress-free and at the same temperature;
   a measuring gage arranged in position with the bar and the benchmarks to compare the lengths of the bar and the demarcated rail portion, the gage having a scale which expresses unit stress in correspondence with said known analog, the gage being responsive to any difference in lengths of the bar and the rail portion to register on the scale a unit stress due to said length difference at a time when the bar and the rail portion are at substantially the same temperature.

2. The apparatus of claim 1 wherein the scale is presettable to an initial value and registers a compressive unit stress when the rail portion is shorter and a tensile unit stress when the rail portion is longer than the bar.

3. The apparatus of claim 2 wherein the initial value is zero.

4. Apparatus for determining any change in the rail neutral temperature of an axially constrained rail in a railroad track, comprising:
   a metal gage bar having substantially the same coefficient of thermal expansion as the rail, the length of the bar being selected such that any temperature-related change in length is a known analog of each degree of change of temperature of the bar;
   primary and secondary benchmarks attached to the rail to demarcate a portion of the rail which is equal to the length of the gage bar when the bar and the rail are each stress-free and at the same temperature;
   a measuring gage arranged in position with the bar and the benchmarks to compare the lengths of the bar and the demarcated rail portion, the gage having a scale which expresses temperature degrees and is presettable to an initial value when the bar and rail have the same temperature, the gage being responsive to any difference in the lengths of the bar and the rail portion to indicate a first temperature value when the rail portion is shorter and a second temperature value when the rail portion is longer than the bar, the initial value being intermediate the first and second values.

5. The apparatus of claim 4 wherein the initial value is zero and the first and second values represent the difference between the rail neutral temperature and the instantaneous temperature of one of the bar and the rail portion.

6. The apparatus of claim 5 wherein the initial value is the instantaneous temperature of one of the bar and the rail portion and the first and second values directly represent the rail neutral temperature of the rail portion.

7. A process for determining unit stress in an axially constrained railroad rail, comprising the steps of:
   installing on said rail a pair of spaced apart benchmarks to demarcate a portion of the rail;

placing a metal gage bar in a position relative to said benchmarks that will permit the lengths of the bar and rail portion to be compared, the bar and the rail having substantially the same coefficient of thermal expansion, the bar length being selected such that each increment of temperature-related change in length is a known analog of internal unit stress that results from an equal change in length caused by an external force;

calibrating the demarcated rail portion and the bar to be of substantially equal length when the bar and rail each are stressfree and at the same temperature;

subsequently measuring any difference between the length of the bar and rail portion while the rail is constrained and the bar is stress free and each is at substantially the same temperature; and registering said difference as unit stress in correspondence with said known analog.

8. The process of claim 7 wherein said difference is registered as a compressive unit stress when the rail portion is shorter and as a tensile unit stress when the rail is longer than the bar.

9. The process of claim 8 wherein the measuring and registering steps employ a gage which is presettable to an initial value and which changes from said initial value to register said unit stress.

10. The process of claim 9 wherein the initial value is zero.

11. A process for determining any change in the rail neutral temperature in an axially constrained railroad rail, comprising the steps of:

installing on said rail a pair of spaced apart benchmarks to demarcate a portion of the rail;

placing a metal gage bar in a position relative to said benchmarks that will permit the lengths of the bar and rail portion to be compared, the bar and the rail having substantially the same coefficient of thermal expansion, the bar length being selected such that each increment of temperature-related change is a known analog of each degree of temperature change of the bar;

calibrating the demarcated rail portion and the bar to be of substantially equal length when the bar and rail each are stressfree and at the same temperature;

subsequently measuring any difference between the length of the bar and rail portion while the rail portion is constrained, the bar is stress free and the bar and the rail portion are at substantially the same temperature; and registering said difference in temperature degrees.

12. The process of claim 11 wherein the measuring and registering steps employ a gage which is presettable to an initial value and changes from said initial value to register said difference in temperature degrees as a first value when the rail portion is longer and a second value when the rail portion is shorter than the bar, the initial value being intermediate the first and second values.

13. The process of claim 12 wherein the initial value is zero and the first and second values represent the difference between the rail neutral temperature and the instantaneous temperature of one of the bar and the rail portion.

14. The process of claim 13 wherein the initial value is the instantaneous temperature of one of the bar and the rail portion and the first and second values directly represent the rail neutral temperature of the rail portion.

15. A process for determining the current rail neutral temperature of an axially constrained railroad rail, comprising the steps of:

installing on said rail a pair of spaced apart benchmarks to demarcate a portion of the rail;

placing a metal gage bar in a position relative to said benchmarks that will permit the lengths of the bar and rail portion to be compared, the bar and the rail having substantially the same coefficient of thermal expansion, the bar length being selected such that each increment of temperature-related change is a known analog of each degree of temperature change of the bar;

calibrating the demarcated rail portion and the bar to be of substantially equal length when the bar is stress-free and the rail is constrained;

removing the constraint of the rail portion;

subsequently measuring any difference between the lengths of the bar and rail portion while each is stress free and at substantially the same temperature; and registering said difference in temperature degrees.

16. The process of claim 15 wherein the measuring and registering steps employ a gage which is presettable to an initial value and changes from said initial value to register said difference in temperature degrees as a first value when the rail portion is longer and a second value when the rail portion is shorter than the bar, the initial value being intermediate the first and second values.

17. The process of claim 16 wherein the initial value is zero and the first and second values represent the difference between the rail neutral temperature and the instantaneous temperature of one of the bar and the rail portion.

18. The process of claim 16 wherein the initial value is the instantaneous temperature of one of the bar and the rail portion and the first and second values directly represent the rail neutral temperature of the rail portion.

19. A process for establishing the rail neutral temperature of a railroad rail at a selected temperature above the instantaneous temperature of the rail, comprising the steps of:

installing on said rail while stress-free a pair of benchmarks spaced apart to demarcate a portion of the rail;

placing a metal gage bar in a position relative to the benchmarks that will permit the lengths of the bar and rail portion to be compared, the bar and the rail having substantially the same coefficient of thermal expansion, the bar length being selected such that each increment of temperature-related change in length is a known analog of each degree of change of temperature of the bar;

calibrating the demarcated rail portion and the bar to be of substantially equal length when the bar and rail each are stressfree and at the same temperature;

elongating the rail into tension;

measuring the difference in length of the bar and the rail during the elongating step;

registering said difference in temperature in degrees;

holding the rail in tension when the registered temperature equals the selected temperature; and constraining the rail during the holding step.

* * * * *